(12) United States Patent
Park et al.

(10) Patent No.: US 10,137,861 B2
(45) Date of Patent: Nov. 27, 2018

(54) SLIM-TYPE SMART CARD KEY OF VEHICLE AND CONTROL METHOD THEREFOR

(71) Applicant: SEOYON ELECTRONICS CO., LTD., Ansan-si, Gyeonggi-do (KR)

(72) Inventors: Ki Woong Park, Seoul (KR); Dong Ho Lee, Seoul (KR)

(73) Assignee: SEOYON ELECTRONICS CO., LTD., Ansan-si (KR)

( * ) Notice: Subject to any disclaimer, the term of this patent is extended or adjusted under 35 U.S.C. 154(b) by 0 days.

(21) Appl. No.: 15/027,676

(22) PCT Filed: Oct. 7, 2014

(86) PCT No.: PCT/KR2014/009442
§ 371 (c)(1),
(2) Date: Apr. 6, 2016

(87) PCT Pub. No.: WO2015/053537
PCT Pub. Date: Apr. 16, 2015

(65) Prior Publication Data
US 2016/0250996 A1   Sep. 1, 2016

(30) Foreign Application Priority Data

Oct. 7, 2013   (KR) ........................ 10-2013-0119324
Oct. 30, 2013  (KR) ........................ 10-2013-0130216
(Continued)

(51) Int. Cl.
*B60R 25/24*   (2013.01)
*E05B 19/00*   (2006.01)
*G07C 9/00*    (2006.01)

(52) U.S. Cl.
CPC ............ *B60R 25/243* (2013.01); *E05B 19/00* (2013.01); *E05B 19/0082* (2013.01); *G07C 2009/00952* (2013.01); *G07C 2009/00976* (2013.01)

(58) Field of Classification Search
CPC ... B60R 25/243; E05B 19/00; E05B 19/0082; G07C 2009/00952; G07C 2009/00976
See application file for complete search history.

(56) References Cited

U.S. PATENT DOCUMENTS 5,561,331 A    10/1996 Suyama et al.
5,801,614 A *  9/1998 Kokubu ................ B60R 25/021
                                                    307/10.2
(Continued)

FOREIGN PATENT DOCUMENTS

CN    102392558 A    3/2012
CN    103198537 A    7/2013
(Continued)

*Primary Examiner* — Tuan C To
(74) *Attorney, Agent, or Firm* — Birch, Stewart, Kolasch & Birch, LLP

(57) ABSTRACT

The present disclosure relates to a slim smart card key for a vehicle and a control method thereof, and improves assembly convenience and product durability by including including the following: a Printed Circuit Board (PCB) to which a plurality of electronic components are soldered, which has a predetermined thickness, and in which a spare key receiving part and a battery receiving part are formed, wherein the spare key receiving part is formed by vertically cutting one side of the PCB and thus is vertically hollow, and the battery receiving part is formed by vertically cutting the other side of the PCB and thus is vertically hollow; a body part which has a spare key entrance hole for inserting a spare key through the spare key receiving part, and a battery entrance hole for inserting a battery through the battery receiving part, and which is injection molded to embrace the PCB (Continued)

while the PCB is inserted into a mold; a spare key settling part which is moved toward the spare key receiving part from above or below the PCB before the body part is injection molded, and then sits on and fixed onto a circumference of the spare key receiving part; and a terminal assembly which is moved in the same direction as that of the spare key settling part before the body part is injection molded, and then sits on and fixed onto a circumference of the battery receiving part.

11 Claims, 24 Drawing Sheets

(30) Foreign Application Priority Data

| Nov. 1, 2013 | (KR) | ........................ 10-2013-0132423 |
| Dec. 11, 2013 | (KR) | ........................ 10-2013-0154061 |

(56) References Cited

U.S. PATENT DOCUMENTS

| 6,522,029 | B1* | 2/2003 | Bell ........................ B60R 25/04 123/179.2 |
| 7,664,470 | B2 | 2/2010 | Sugimoto et al. |
| 8,751,065 | B1* | 6/2014 | Kato .................. H04M 1/72533 340/426.13 |
| 2003/0222755 | A1* | 12/2003 | Kemper ............. G07C 9/00944 340/5.61 |
| 2005/0234601 | A1 | 10/2005 | Suzuki |
| 2006/0017550 | A1* | 1/2006 | Yoshida .................. B60R 25/04 340/426.11 |
| 2006/0246851 | A1 | 11/2006 | Sugimoto et al. |
| 2009/0040737 | A1* | 2/2009 | Shimura ............ G07C 9/00944 361/752 |
| 2009/0178448 | A1* | 7/2009 | Tamezane ........... B60R 25/2036 70/262 |
| 2011/0313595 | A1* | 12/2011 | Kato .................. E05B 19/0082 701/2 |
| 2012/0012659 | A1 | 1/2012 | Sugimoto et al. |
| 2012/0092128 | A1* | 4/2012 | Yamane ............... E05B 19/0082 340/5.64 |
| 2012/0271487 | A1* | 10/2012 | Lickfelt .................. B60R 25/00 701/2 |
| 2012/0310447 | A1* | 12/2012 | Toki ........................ B60R 25/24 701/2 |
| 2013/0069768 | A1* | 3/2013 | Madhyastha .......... G08C 19/12 340/12.5 |
| 2013/0124409 | A1* | 5/2013 | Healy ..................... G06Q 40/02 705/43 |
| 2013/0158744 | A1* | 6/2013 | Inoue ................. G07C 9/00309 701/2 |
| 2013/0210360 | A1* | 8/2013 | Ljung ..................... H04W 4/80 455/41.2 |
| 2014/0078689 | A1* | 3/2014 | Paek .................. G07C 9/00944 361/748 |
| 2014/0103789 | A1* | 4/2014 | Cox, III .................... H05K 5/02 312/280 |
| 2014/0301565 | A1* | 10/2014 | Dorland .................. B60R 25/20 381/86 |
| 2015/0028995 | A1* | 1/2015 | Gautama ............... B60R 25/406 340/5.72 |

FOREIGN PATENT DOCUMENTS

| EP | 1 574 385 A1 | 9/2005 |
| JP | 7-293079 A | 11/1995 |
| JP | 2002-21386 A | 1/2002 |
| JP | 2005-247254 A | 9/2005 |
| JP | 2005303467 A * | 10/2005 |
| KR | 10-2005-0076037 A | 7/2005 |
| KR | 100747741 B1 * | 8/2007 |
| KR | 20100079607 A * | 7/2010 |
| KR | 10-2012-0006949 A | 1/2012 |
| KR | 101200647 B1 * | 11/2012 |
| KR | 10-2013-0079901 A | 7/2013 |
| KR | 10-2013-0081099 A | 7/2013 |
| KR | 10-2013-0107720 A | 10/2013 |

* cited by examiner

SLIM-TYPE SMART CARD KEY OF VEHICLE AND CONTROL METHOD THEREFOR

CROSS REFERENCE TO RELATED APPLICATIONS

This application is the National Phase of PCT International Application No. PCT/KR2014/009442, filed on Oct. 7, 2014, which claims priority under 35 U.S.C. 119(a) to Patent Application Nos. KR 10-2013-0119324, filed in Republic of Korea on Oct. 7, 2013, KR 10-2013-0130216, filed in Republic of Korea on Oct. 30, 2013, KR 10-2013-0132423, filed in Republic of Korea on Nov. 1, 2013, and KR 10-2013-0154061, filed in Republic of Korea on Dec. 11, 2013, all of which are hereby expressly incorporated by reference into the present application.

TECHNICAL FIELD

The present disclosure relates to a slim smart card key for a vehicle, and a control method thereof, and more specifically, to a slim smart card key, which is thin and sold sufficiently to be carried within a wallet or a bag, which reduces the number of intermediate processes as much as possible to resolve inconvenience of a manufacturer and reduce a manufacturing time, and which applies an Remote Keyless Entry (RKE) function for actively locking or unlocking a door of a vehicle to thereby improve user convenience and reduce power consumption of a battery, and a control method of the slim smart card key.

BACKGROUND ART

Generally, a key assembly for operating a car engine by a user is arranged inside a car, and, if an operating key is inserted into the key assembly and rotated, the engine starts to operate. Recently, it is possible to operate an engine simply by pressing a start button provided inside the car, without using the operating key.

Due to development of communication technologies, a so-called smart key system has been introduced which is designed to improve user convenience and prevent car theft and which works such that a user having a smart key performs encrypted wireless communication with an Electronic Control Unit (ECU) installed in a vehicle and only an allowed user is able to operate the engine of the car.

The smart key system is a developed version of a car lockset for preventing car theft, and the smart key system works such that a smart key for starting a car wirelessly generates an encrypted code, and a car engine starts to operate only when the ECU determines that the encrypted code conforms to a set code.

That is, the smart key system is an anti-theft system in which a car engine is allowed to start using a start button only when a driver having the smart key is at least in proximity where communication with the ECU is possible, so that it is possible to prevent a non-allowed user from robbing the car.

A slim smart card key used in a smart key system of a related art is generally large in size and not convenient to carry. In addition, in a case where the smart key is reduced in size, an additional function other than a user authentication function cannot be applied, and thus, this is the reason that it is difficult to make the card key thin.

These days, the smart key is tends to be made as a thin card key for wallet carrying, but, if the smart key decreases in thickness to be thin, it may degrade hardness and the smart key may be easily damaged by a physical frictional force within a wallet.

In particular, a wireless communication device has to include a spare key receiving part for receiving a spare key that is used in an emergency situation where the smart key system is unable to work for some reasons, including battery discharge of a smart key. If this spare key receiving part is made of an epoxy molding material, a spare key settling part of a steel material different from the epox molding material should be provided to prevent damage led by a physical contact with the spare key.

Before the spare key receiving part is formed using the epoxy molding material, the spare key settling part needs to be fixed on to a Printed Circuit Board (PCB), and it may make the manufacturing process complicated.

In addition, since the smart key needs to be made thin, it is difficult to form a switch unit which is able to transmit an active entrance signal for locking or unlocking a car door as a user actively applies the signal at a remote location.

DISCLOSURE

Technical Problem

The present disclosure is designed to solve the above technical objectives, and aims to provide a slim smart card key for a vehicle, and a control method thereof, wherein the slim smart card is molded to prevent a Printed Circuit Board (PCB) from being exposed from a body part, and is made as thin and as strong as possible to be conveniently carried within a wallet or a bag.

In addition, the present disclosure aims to provide a slim smart card key for a vehicle, and a control method thereof, wherein the slim smart card key is manufactured by minimizing the number of processes for assembling all components of the PCB so as to resolve a worker's inconvenience.

In addition, the present disclosure aims to provide a slim smart card key for a vehicle, and a control method thereof, wherein a non-contact type switch is applied to the slim smart card key.

In addition, the present disclosure aims to provide a slim smart card key for a vehicle, and a control method thereof, wherein a Remote Keyless Entry (RKE) function is efficiently applied using a touch sensor to the slim smart card key to thereby improve user convenience.

In addition, the present disclosure aims to provide a slim smart card key for a vehicle, and a control method thereof, wherein a switching function is able to applied to the slim smart card key to enable a car door to be locked and unlocked in response to an active switching operation.

Objectives of the present disclosure are not limited to the aforementioned objectives, and other objectives not mentioned herein could be clearly understood by those skilled in the art based on the following descriptions.

TECHNICAL SOLUTION

An embodiment of a slim smart card key for a vehicle according to the present disclosure includes: a Printed Circuit Board (PCB) to which a plurality of electronic components are soldered, which has a predetermined thickness, and in which a spare key receiving part and a battery receiving part are formed, wherein the spare key receiving part is formed by vertically cutting one side of the PCB and thus is vertically hollow, and the battery receiving part is formed by vertically cutting the other side of the PCB and thus is vertically hollow;

a body part which has a spare key entrance hole for inserting a spare key through the spare key receiving part, and a battery entrance hole for inserting a battery through the battery receiving part, and which is injection molded to embrace the PCB while the PCB is inserted into a mold;

a spare key settling part which is moved toward the spare key receiving part from above or below the PCB before the body part is injection molded, and then sits on and fixed onto a circumference of the spare key receiving part; and a terminal assembly which is moved in the same direction as that of the spare key settling part before the body part is injection molded, and then sits on and fixed onto a circumference of the battery receiving part, and the spare key settling part vertically may protrude by a predetermined length from the spare key receiving part on the PCB.

The spare key settling part may include: an upper plate in which an upper portion settling part is formed, wherein the upper portion protrudes upwardly toward a top of the spare key receiving part, is bent downwardly toward one side among directions orthogonal to a longitudinal direction of the spare key receiving part, and then is extended in parallel; a lower plate in which a lower portion settling part is formed, wherein the lower portion protrudes downwardly toward a bottom of the spare key receiving part, is bent upwardly in one side among directions orthogonal to the longitudinal direction of the spare key receiving part; and a connecting plate which connects the upper plate, which corresponds to the other side among directions orthogonal to the longitudinal direction of the spare key receiving part, and an end of the lower plate.

The upper portion settling part and the lower portion settling part may be formed at the same height.

A plurality of upper portion settling parts and a plurality of lower portion settling parts may be provided, and the upper portion settling parts each may be arranged between the lower portion settling parts which are adjacent to one another.

A side portion settling part for holding the spare key settling part may be formed in the connecting plate.

The upper portion settling part, the lower portion settling part, and the side portion settling part may sit on a top surface of the PCB.

A plurality of side portion settling parts may be spaced apart from one another and formed at the same height as that of the upper portion settling part and the lower portion settling part, and a solder groove for soldering to a top surface of the PCB may be formed in the upper portion settling part, the lower portion settling part, and the side portion settling part.

The plurality of location setting groove may be provided on the PCB to arrange the spare key settling part at a right location, and a location setting protrusion, which is to be inserted into the location setting groove, may be formed at an end of the upper portion settling part to be bent downwardly.

The terminal assembly may include: a first polarity terminal plate which connects a bottom contact surface formed on a bottom surface of the battery inserted through the battery entrance hole; ands second polarity terminal plate which connects to a top contact surface formed on a top surface of the battery inserted through the battery entrance hole, wherein a specific space in which the battery is inserted is formed between the first polarity terminal plate and the second polarity terminal plate, and the first polarity terminal plate and the second polarity terminal plate sit on the PCB.

The first polarity terminal plate may protrude toward a bottom of the battery receiving part, and the second polarity terminal plate protrudes a top of the battery receiving part.

A first polarity connecting protrusion may be formed on a top surface of the first polarity terminal plate to protrude so as to connect the bottom contact surface of the battery, and a second polarity connecting protrusion may be formed on a bottom surface of the second polarity terminal plate to protrude so as to connect the top contact surface of the battery.

A plurality of first polarity connecting protrusion and a plurality of second polarity connecting protrusion may be formed being spaced apart one another.

An antenna assembly hole may be formed on the PCB to be vertically hollow, and part of an antenna assembly may be inserted into the antenna assembly hole.

The antenna assembly may include: an antenna part inserted into the antenna assembly hole; and a sub PCB in which an vertically hollow opening to allow the antenna part to be inserted is formed, and which is soldered to one surface of the PCB to electrically connect the antenna part and the PCB.

Another embodiment of a slim smart card key for a vehicle according to the present disclosure includes: a spare key which has a magnetic; a Printed Circuit Board (PCB) which has a hall sensor that is switched due to a magnetic force of the magnetic, and in which a spare key receiving part for accommodating the spare key is formed; and a body in which the PCB is accommodated, and a spare key entrance hole, through which the spare key is inserted, is formed at a location corresponding to the spare key receiving part.

A plurality of hall sensors may be provided.

A handle portion used by a user to hold the spare key may be provided at one end of the spare key, and the magnetic is provided in the handle portion.

The magnetic may be insert molded in the handle portion.

The PCB may have a coupler of a steel material at a location that corresponds to the magnetic when the spare key is inserted into the spare key receiving part.

The PCB may include a movement detecting sensor which detects movement of the body, of which a degree is equal to or greater than a predetermined level.

The movement detecting sensor may transmit a predetermined output signal when detected movement of the body is equal to or greater than the predetermined level, and the vehicle may operate a horn and/or emergency light to provide a user with location information of the vehicle.

The slim smart card key further includes a battery which provides power to the PCB, wherein a battery receiving part for accommodating the battery is formed in the PCB, and a battery entrance hole, through which the battery is inserted, is formed at a location that corresponds to the battery receiving part.

The battery receiving part may be formed at a location that opposes the spare key receiving part.

The PCB may further include a spare key settling part which is arranged in the spare key receiving part to form a space in which the spare key is inserted.

Another embodiment of a slim smart card key for a vehicle according to the present disclosure includes: a body of which outer appearance is molded as a molding material is hardened by a insert injection molding process; a Printed Circuit Board (PCB) to which various electronic components are soldered before a molding process is performed by the insert injection molding process, and which is disposed inside the body when the body is molded by the insert injection molding process; a plurality of touch sensor switch which are soldered to the PCB before the body is molded, and which generates an electrical signal when a user touches, with a finger, on a specific portion on an outer surface of the body after body is molded; and a logo panel which is coupled to one surface of the body to be enabled to be pushed by a user and which visually provides the user with predetermined information, wherein the logo panel is a manipulation knob of an operation-on switching unit which wakes up the plurality of touch sensor switches.

The plurality of touch sensor switch may include a lock switch for locking a side door of the vehicle, and a unlock switch for unlocking the side door of the vehicle.

The plurality of touch sensor switches may include a touch sensor which generates the predetermined electrical signal in response to a static electricity touch.

The operation-on switching unit may include the manipulation knob, and a switch contactor which is soldered to the PCB before the body is molded.

The manipulation knob may integrated with a deco sheet coupled to one side surface of the body, and have an outer side surface on which a logo of a manufacturer is printed.

The switch contactor may be a silver-coated or gold-coated circuit that is printed on the PCB.

A connecting pad may be provided between the manipulation knob and the switch contactor to connect the switch contactor in response to a push operation of the manipulation knob.

The slim smart card key may further include a display unit which is coupled to the PCB before the body is molded, and which visually displays whether a Remote Keyless Entry (RKE) function is performed according to operations of the plurality of touch sensor switches.

Another embodiment of a slim smart card key for a vehicle according to the present disclosure includes: a body of which outer appearance is molded as a molding material is hardened by an insert injection molding process; a Printed Circuit Board (PCB) to which various electronic components are soldered before a molding process is performed by the insert injection molding process, and which is disposed inside the body when the body is molded by the insert injection molding process; a switching unit which is coupled to the PCB before or after the body is molded, and which locks or unlocks a door of the vehicle according to a user's manipulation; and a display unit which is coupled to the PCB before or after the body is molded, and which visually displays a locking status of the door according to an operation of the switching unit.

The switching unit may include: a lock switch button which generates a signal for locking the door; and an unlock switch button which generates a signal for unlocking the door.

In assumptions that the body is formed lengthwise, of which short side edges consist of one short side edge and the other short side edge, and long side edges consist of one long side edge and the other long side edge, in a case where the spare key receiving part, in which a spare key is inserted from the one short side edge to an inner space of the body, is formed close the one long side edge, the switching unit may be formed close to the other long side edge that opposes the one short side edge on which the spare receiving part is formed.

The display unit may be formed close to the other short side edge that opposes the one short side edge on which the spare key receiving part is formed.

The display unit may be an Light Emitting Display (LED) which displays lights with different kinds of color.

The switching unit may be soldered to the PCB before the body is molded, and the body may be molded by the insert injection molding process as the molding material is primarily hardened to form an empty space on the PCB, and then an operation knob may be formed as a molding material is secondarily hardened in the body, and then the switching unit is covered the operation knob.

The body may be molded by the insert injection molding process as the molding material is primarily hardened to form an empty space on the PCB, and then, the switching unit may be soldered to the PCB corresponding to the empty space, and then, the switching unit may be covered by an operation knob that is molded as the material mold is secondarily hardened.

The slim smart card key may further include a lower mold for the insert injection molding process, and an upper mold to be secured to the lower mold, wherein a molding preventive unit forming the empty space is formed in the upper mold to protrude downwardly.

In a case where the switching unit is soldered to the PCB before the body is molded, a cavity may be formed on a bottom surface of the molding preventive unit to cover the switching unit.

The display unit may be soldered to the PCB before the body is molded, a top of the display is covered by a temporary frame to prevent the molding material from flowing into the top of the display panel when the body is molded in the insert injection molding process.

After the body is molded in the insert injection molding process, an empty space made by removing the temporary frame may be filled with a cover portion of a silicon material.

The cover portion may be made of a transparent material.

One embodiment of a control method of a slim smart card key for a vehicle according to the present disclosure includes: waking up when a card key approaches within a predetermined distance from the vehicle; after the waking-up, determining whether an operation-on switching unit is electrically connected; in response to a determination that the operation-on switching unit is electrically connected, waking up a plurality of touch sensor switches; after the waking-up of the touch sensor switches, performing an Remote Keyless Entry (RKE) function to lock or unlock a side door of the vehicle according to whether a touch sensor operates; and in response to a predetermined period of time being elapsed after the waking-up of the touch sensor switches, causing the touch sensor switches to sleep.

The predetermined period of time may be equal to or less than five seconds.

The plurality of touch sensor switch may include a lock switch for locking the side door of the vehicle, and an unlock switch for unlocking the side door of the vehicle, and, in the performing of the RKE function, a trunk door of the vehicle may be controlled to be unlocked when a user's touch is simultaneously detected by a touch sensor of the lock switch and by a touch sensor of the unlock switch for at least a predetermined period of time.

Advantageous Effects

A slim smart card key for a vehicle and a control method thereof according to the present disclosure may achieve various effects as below.

First, a Printed Circuit Board (PCB) is injection molded not to be exposed from a body part, so the slim smart card key may be made thin to be kept in a wallet or a bag, so that mobility may improve.

Second, a spare key settling part, which is coupled to a spare key receiving part formed in the PCB in order to reinforce hardness, is arranged in the same direction as that of other components and then soldered, so that assembling time may be reduced.

Third, using a non-contact type sensor, rather a button or a tact switch, may help manufacture a small-sized card key, so that mobility may improve.

Fourth, a body is insert injection molded on the PCB and it results in reduction in the number of intermediate processes, so that production may improve.

Fifth, an Remote Keyless Entry (RKE) function is actively utilized using a static electricity-type touch sensor switch without increasing a slim cardkey in thickness, so that user convenience may improve.

Sixth, a slim card key even including a switching unit is able to be embodied and it makes it easy to keep the slim card key, so that user convenience may improve.

Seventh, when a body is molded by an insert injection molding process, a switching unit and a display unit may be soldered before or after the body is molded, and thus, it may improve work convenience.

Effects of the present disclosure are not limited to the aforementioned effects, and other effects not mentioned herein may be clearly understood by those skilled in the art based on the following claims.

BEST MODE

The terminology used herein is for the purpose of describing particular embodiments only and is not intended to be limiting of the present disclosure. Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Hereinafter, one preferable embodiment according to the present disclosure is described in detail with reference to accompanying drawings, and an identical or similar component is indicated by the same numeral refrence and not described redundantly.

Also, descriptions of well-known functions and constructions may be omitted for increased clarity and conciseness. The accompanying drawings are provided to assist the reader in gaining a comprehensive understanding of the methods, apparatuses, and/or systems described herein, and thus, it should be understood that the concept of the present disclosure is not limited to the accompanying drawings.

Hereinafter, a slim smart card key for a vehicle and a method controlling the same according to the present disclosure will be described with exemplary embodiments shown in the accompanying drawings.

Figure 1:
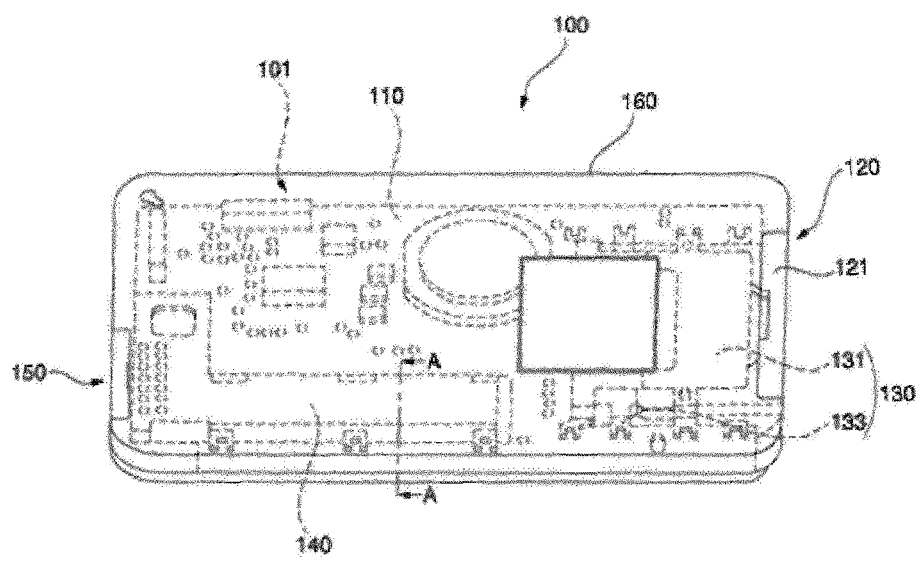
FIG. 1 is a transparent perspective view illustrating a slim smart card key for a vehicle according to an embodiment of the present disclosure.
Figure 2:
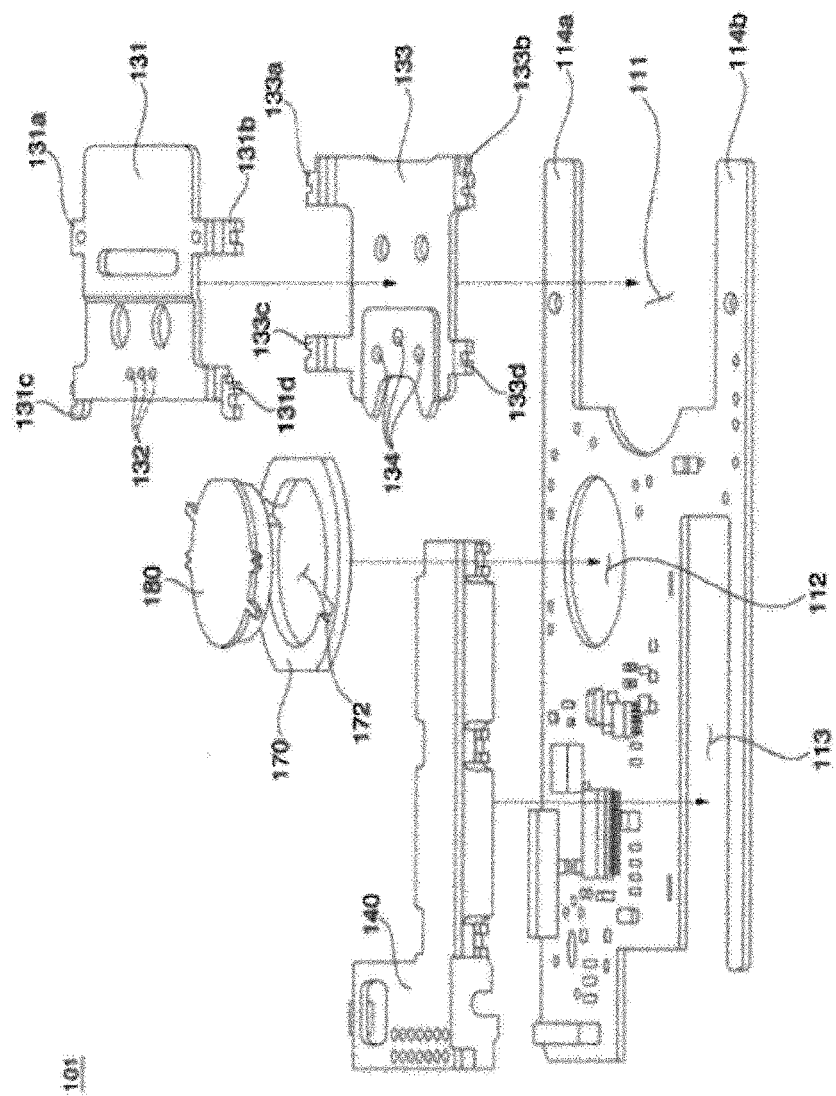
FIG. 2 is an exploded perspective view illustrating components coupled to a Printed Circuit Board (PCB) that is one of components shown in FIG. 1.
Figure 3:
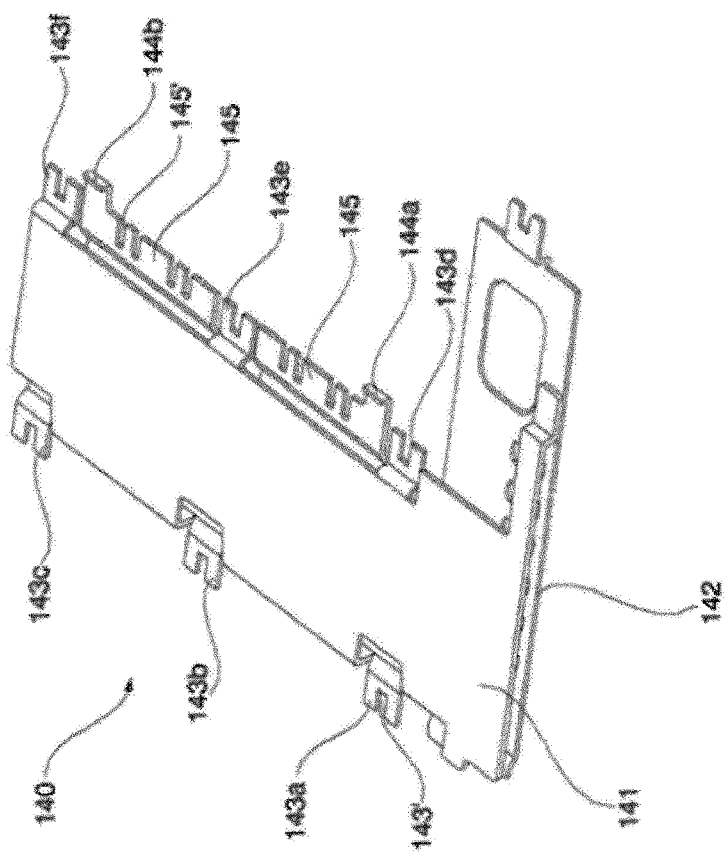
FIG. 3 is a perspective view illustrating a spare key settling part that is one of components shown in FIG. 1.
Figure 4:
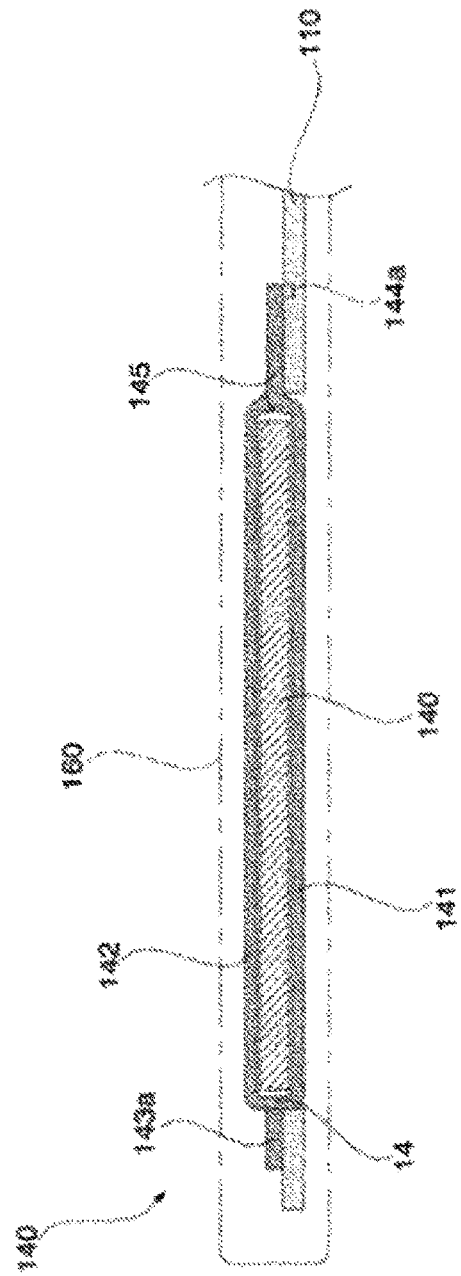
FIG. 4 is a cross-sectional view cut by line A-A shown in FIG. 1.

FIG. 1 is a transparent perspective view illustrating a slim smart card key for a vehicle according to an embodiment of the present disclosure; FIG. 2 is an exploded perspective view illustrating components coupled to a printed circuit board (PCB) that is one of components shown in FIG. 1; FIG. 3 is a perspective view illustrating a spare key settling part that is one of components shown in FIG. 1; FIG. 4 is a cross-sectional view cut by line A-A shown in FIG. 1; FIGS. 5A to 5H are exploded perspective views illustrating a direction in which components are coupled to the PCB shown in FIG. 2; and FIG. 6 is a cross-sectional view cut by line B-B shown in FIG. 5H.

A slim smart card key for a vehicle according to an embodiment of the present disclosure includes a Printed Circuit Board (PCB) assembly 101 disposed inside a body part 110, as shown in FIG. 4.

As well known, a PCB 110 is a board in which a circuit is printed on a plastic object, and an electronic component (numeral reference thereof is not provided) is assembled or soldered to the PCB 110 to contact the circuit and generate various signals in accordance with predetermined operation signals.

The PCB 110 may have a spare key receiving part 113 formed therein, in which a spare key (not shown) is accommodated when inserted inwardly from the outside. The spare key receiving part 113 may be readily injection molded by a frame when the PCB 110 is manufactured, or may be made by cutting a corresponding portion of a lengthwise plate-type PCB 110. In addition, the PCB 110 may have a battery receiving part 111 formed therein, in which a battery (not shown) is accommodated when inserted inwardly from the outside. The battery receiving part 110 is made in the same manner as that of the spare key receiving part 113.

Regarding the PCB assembly 101 having the aforementioned components coupled to the PCB 110, the body part 110 is formed while the PCB assembly 101 is inserted into a mold (not shown), and the body part 110 forms the final outer appearance of the slim smart card key 100 according to the present disclosure. It is desirable that an epoxy molding material forming the body part 110 is poured into the mold.

The reason that the body part 110 is insert-injection molded while the PCB assembly 101 is inserted into the mold is to resolve inconvenience that an assembler encounters due a number of intermediate assembling processes (specifically, processes for coupling upper and lower covers), which is pointed out as a drawback of an existing PCB assembly 101 that is manufactured in a manner where an upper cover and a lower cover of the body part 110 are manufactured to secure an additional space in which the existing PCB assembly 101 is installed. In particular, the existing assembling process does not adapt an injection molding process, and thus, it does not need an additional mold for the insert injection molding process of the body part 110, but it may not only weaken combination between the upper and lower covers, but also expose a final product to a damage due to an external force when the product is carried.

Meanwhile, the slim smart card key 100 is injection molded while the PCB assembly 101 is inserted into a mold, so that the number of intermediate processes for coupling individual components (e.g., upper and lower covers) may be reduced, the need of an additional mold for the upper and lower covers may be removed since it is not necessary to manufacture the two separate covers, and hardness of a final product may improve since a thermosetting resin material is adapted as a material for the body part 110.

In one preferable embodiment of the slim smart card key 100, the body part 110 molded with a molding material may include: a spare key entrance hole for inserting a spare key through the spare key receiving part 113; and a battery entrance hole 120 for inserting a battery through the battery receiving part 111.

While the spare key receiving part 113 and the battery receiving part 111 are formed in a manner where the PCB 110 is cut in a vertical direction, the spare key entrance hole 150 and the battery entrance hole 120 are formed on side portions of the body part 110 so that a spare key and a battery may be inserted in parallel in a longitudinal direction or vice versa of the body part 110 in the spare key receiving part 113 in the assumption that the body part 110 is a thin plate having a predetermined thickness. In this case, the spare key entrance hole 150 and the battery entrance hole 120 are portions which are formed when the body part 110 are injection molded by a mold.

In particular, in the preferable embodiment of the slim smart card key according to the present disclosure, the body part 110 is injection molded by using a mold to form the spare key entrance hole 150 and the battery entrance hole 120, so that a top surface or a bottom surface of the PCB 110 is spaced apart at a predetermined distance from a top surface and a bottom surface of the body part 110 while the PCB 110 is not in contact with a bottom surface of the mold. It is to prevent fall damage of the PCB 110 which is exposed from the molded body part 110 or to prevent any damage of the PCB 110 due to a physical force that is delivered directly to the PCB 110 from the outside, such as an object in surroundings of an inserted portion. Therefore, if the body part 110 is formed in the injection molding process, at least the PCB 110 out of components of the PCB assembly 101 may be completely blocked by the body part 110 made of a hard thermosetting resin material (e.g., EMC) and thereby the PCB 110 may not be exposed to the outside.

Meanwhile, the PCB assembly 101 may include: a spare key settling part 140 coupled to the electronic component, a circuit, and the spare key receiving part 113 to form a space into which the spare key is inserted; and a terminal assembly 130 coupled to the battery receiving part 111 to form a space into which a battery is inserted, and being in contact with the battery to apply power from the battery to the electronic component provided in the PCB 110.

In this case, it is preferable that the body part 110 is formed as a lengthwise plate having a predetermined thickness. In particular, the body part 110 may be a thing plate which has the same size of that of an ordinary credit card so as to be easily carried within a wallet or a back for the sake of mobility, and which has a thickness equal to or less than 3.4 mm.

The spare key entrance hole 150 formed in the body part 110 and the spare key receiving part 113 formed in the PCB 110 communicate each other to allow a spare key to be inserted from the outside. In addition, the battery entrance hole 120 formed in the body part 110 and the battery receiving part 111 formed in the PCB 110 communicate each other to allow a battery to be inserted from the outside.

Meanwhile, the spare key entrance hole 150 and the spare key receiving part 113 are provided at locations which oppose the battery hope 120 and the battery receiving part 111, that is, both ends of a longitudinal direction of the body part 110, so that a spare key and a battery are inserted into a side portion which define thickness. In other words, the spare key receiving part 113 is formed in the PCB 110 to communicate with the spare key entrance hole 150 which is formed so as to allow a spare key to be inserted from one end of the body part 110 to the other end.

As shown in FIG. 2, an antenna assembly hole 112 is formed in the PCB 110 to be vertically hollow, wherein an antenna assembly 170 and 180 for immobilizer communication with a Smart Key Unit (SMK) installed in a vehicle sits in the antenna assembly hole 113. Part of the antenna assembly 170 and 180 may be inserted into the antenna assembly 113.

The antenna assembly 170 and 180 may include: a sub PCB 170 of which circumference is wounded around by a not shown coil and in which a vertically hollow opening 172 is formed; and an antenna part 180 which sits in and coupled to the opening of the sub PCB 170.

The antenna assembly 170 and 180 may be manufactured either in a manner where the sub PCB 170 and the antenna part 180 are coupled to each other and then soldered to the PCB 110, or in a manner where the sub PCB 170 is soldered at the right location on the circumference of the antenna assembly hole 112 formed in the PCB 110 and then the antenna part 180 sits in the opening 172.

Figure 5A:
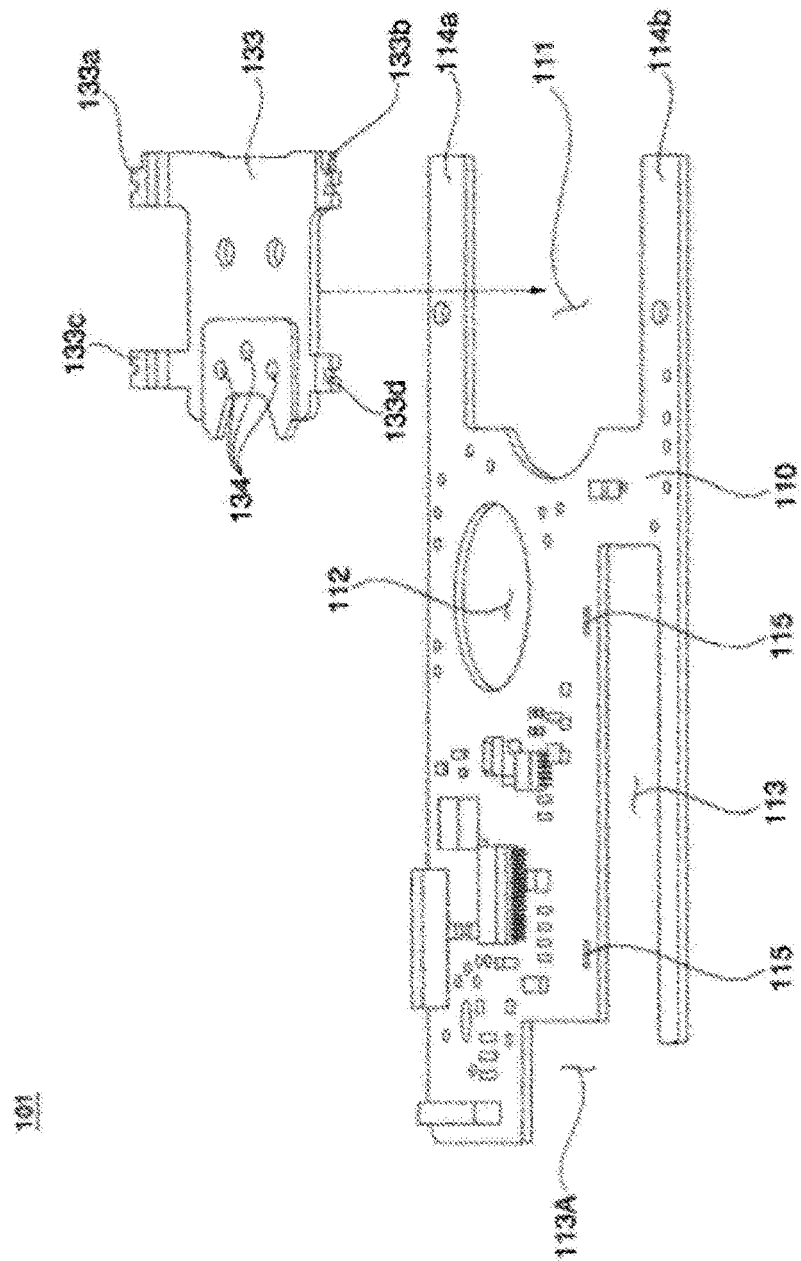
FIGS. 5A to 5H are exploded perspective views illustrating a direction in which components are coupled to the PCB shown in FIG. 2.
Figure 5B:
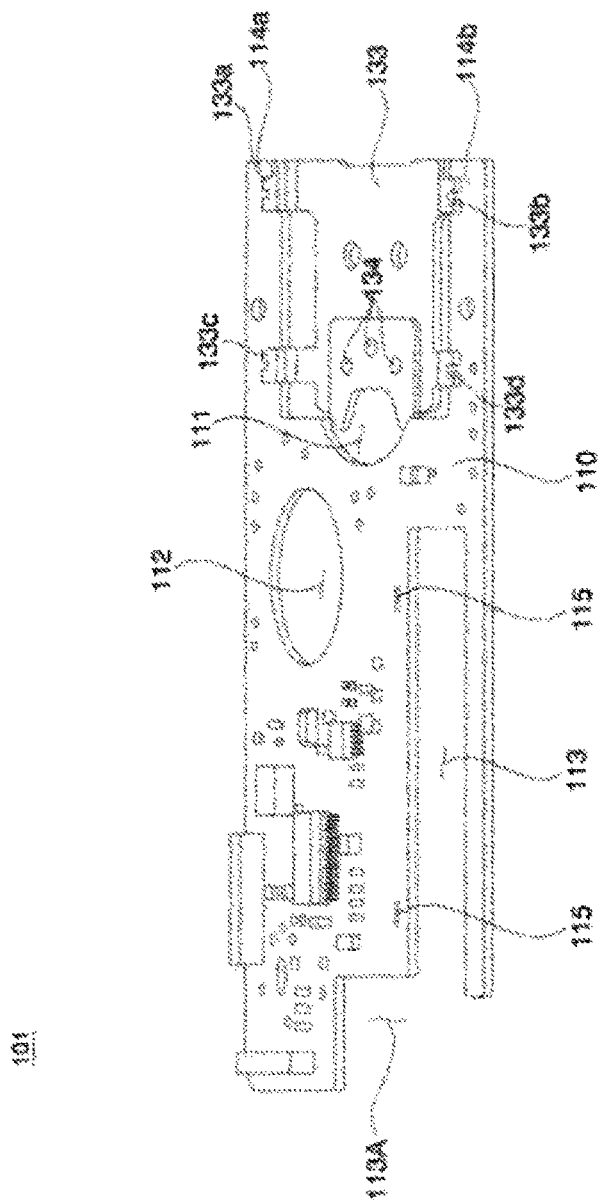
Figure 5C:
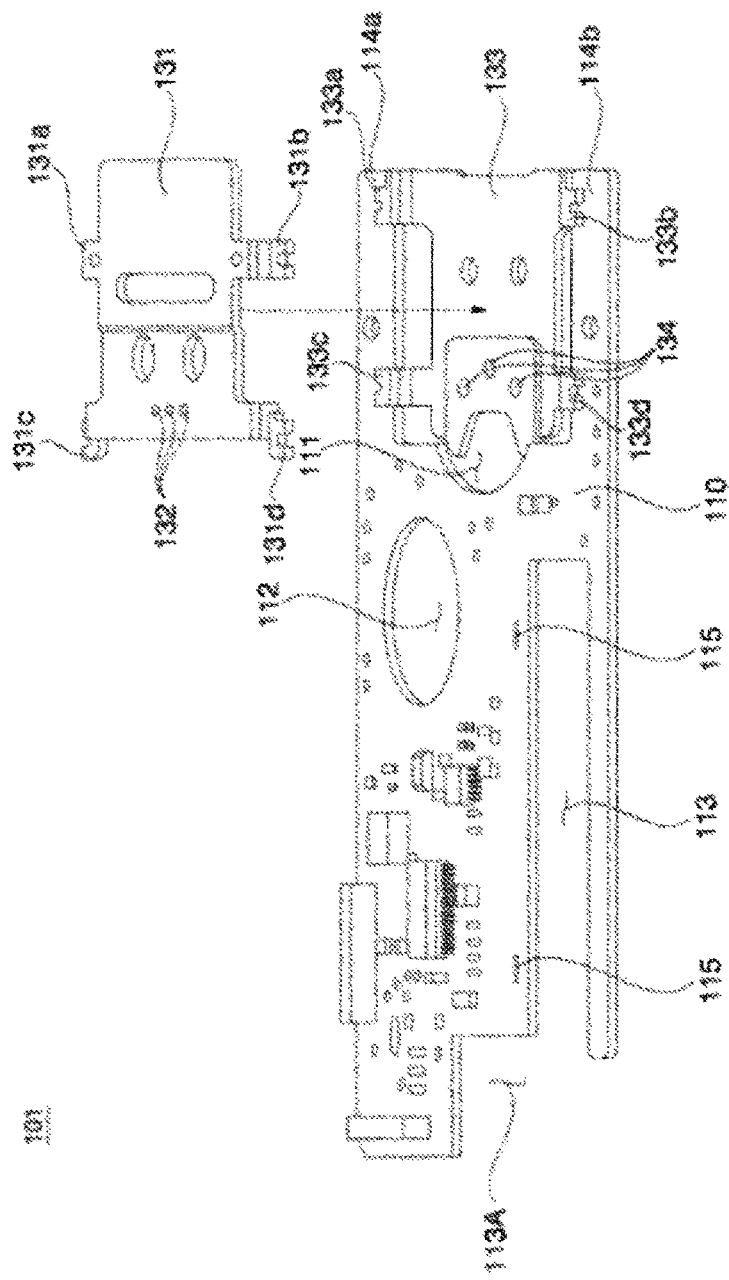
Figure 5D:
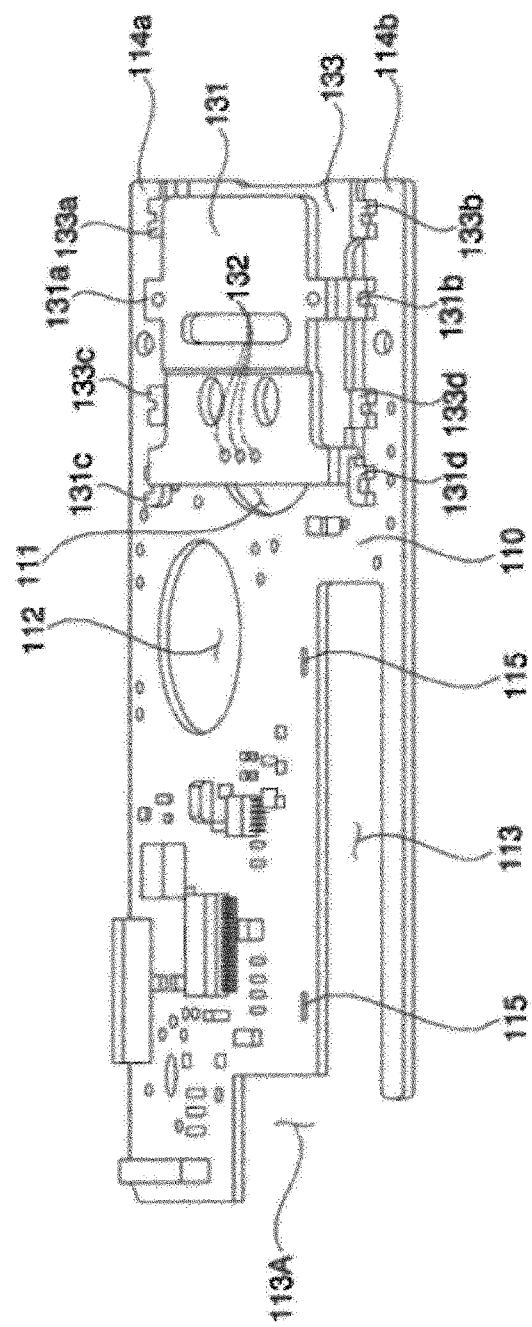
Figure 5E:
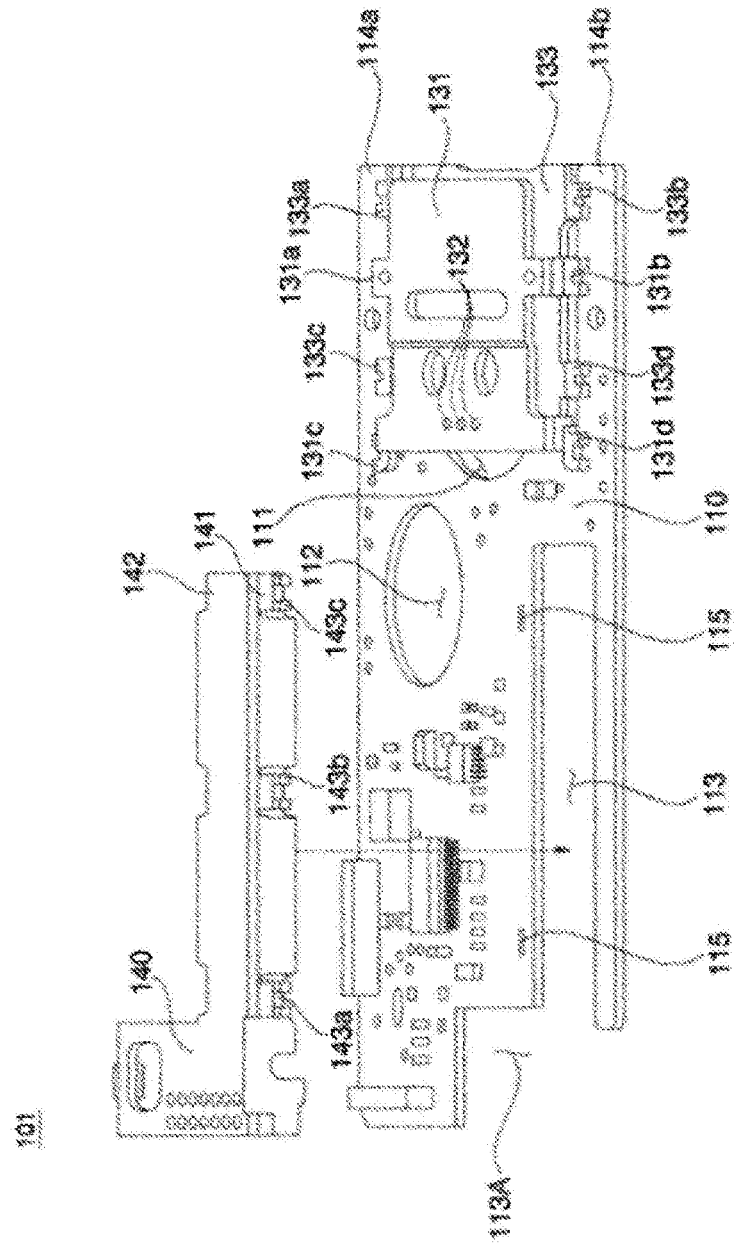
Figure 5F:
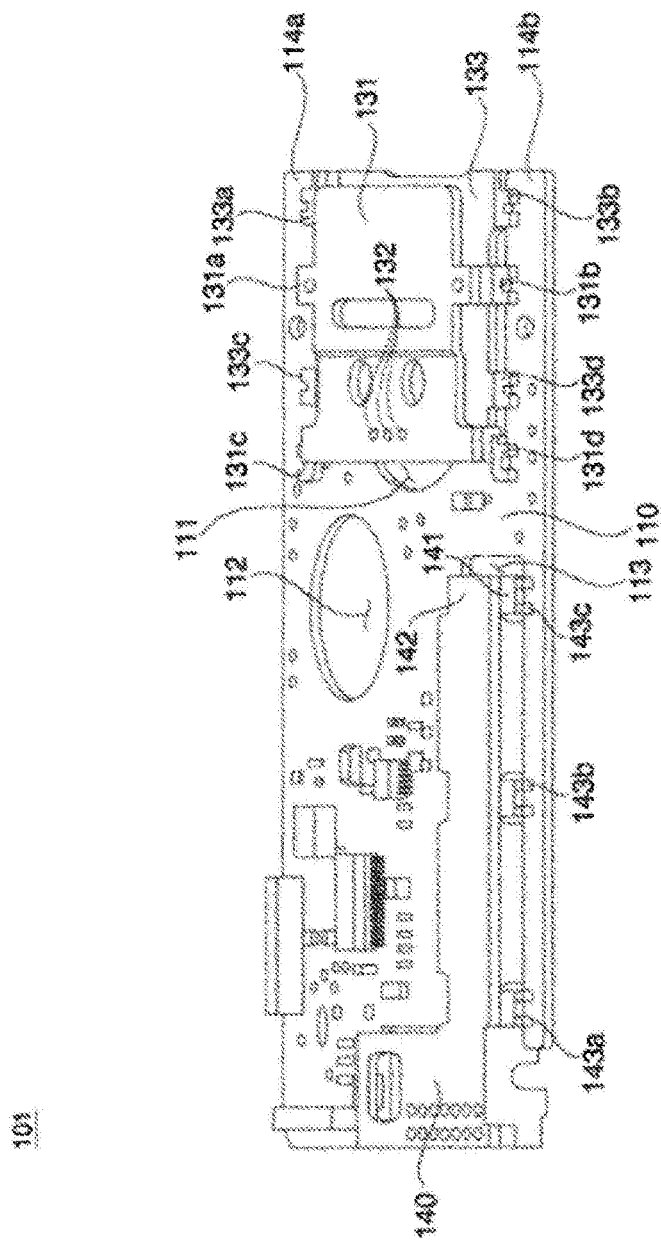
Figure 5G:
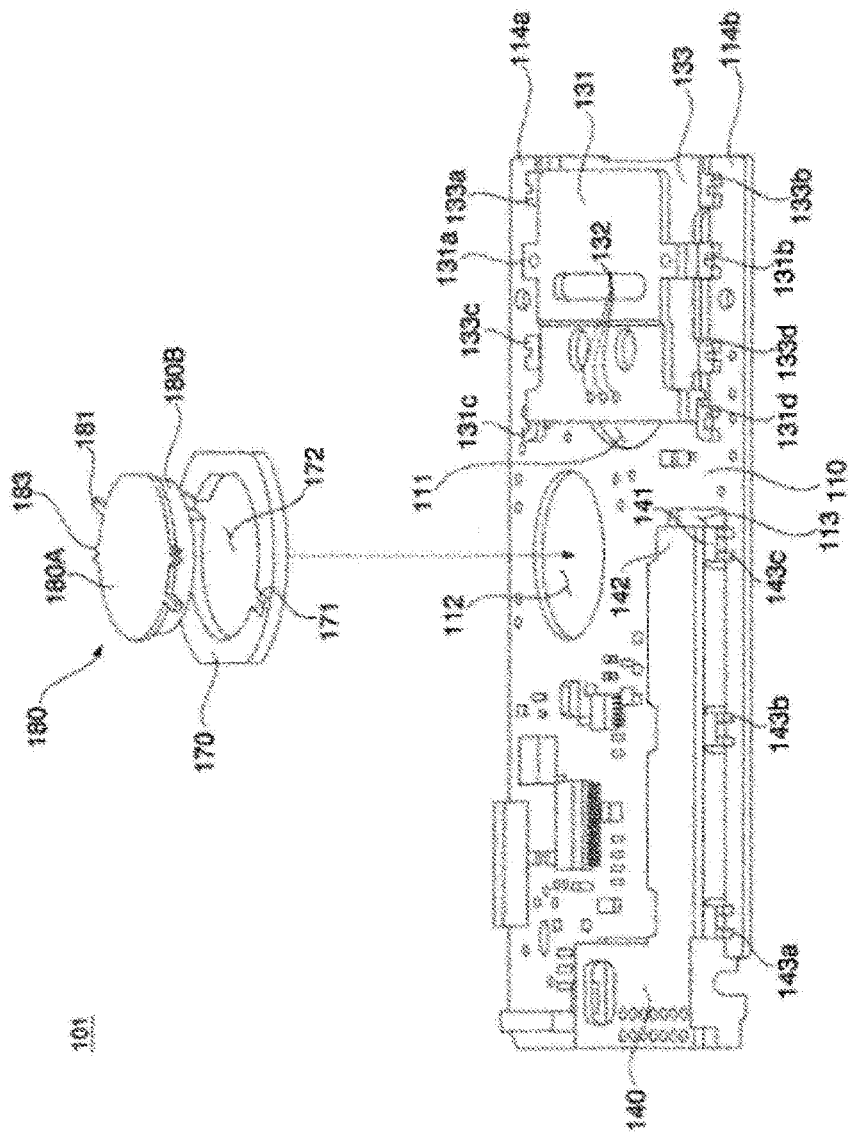
Figure 5H:
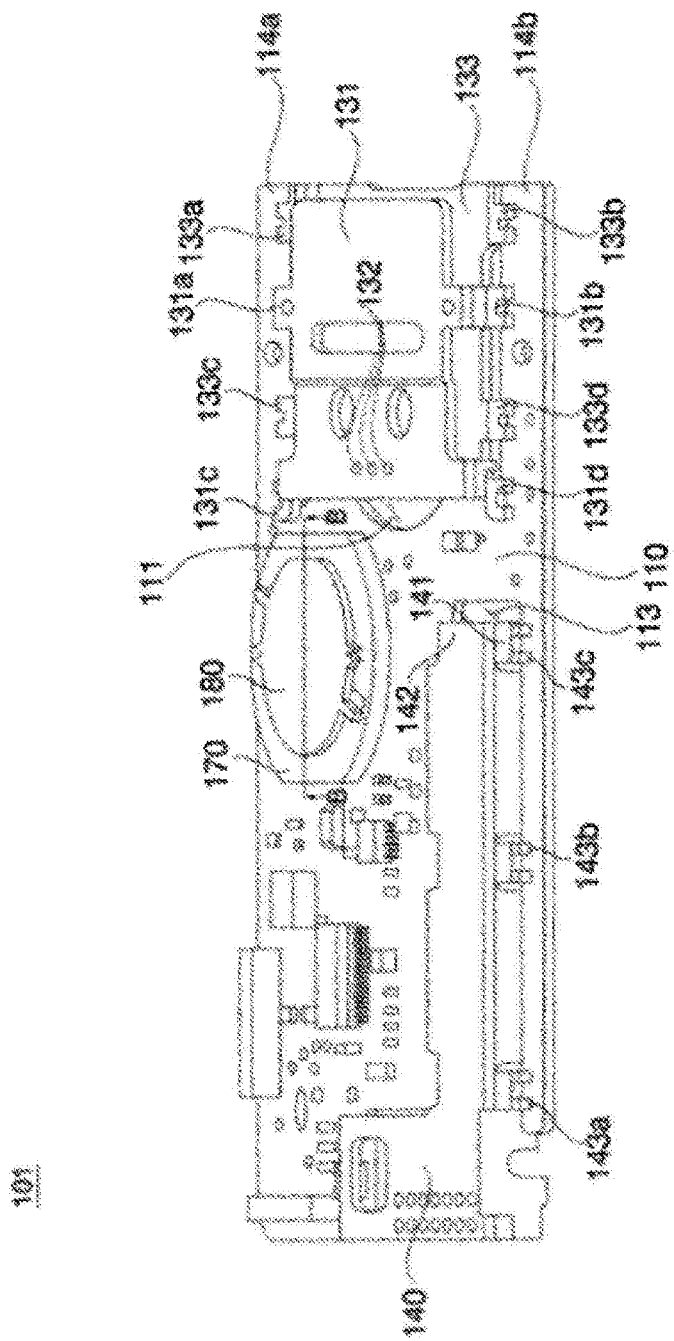
Figure 6:
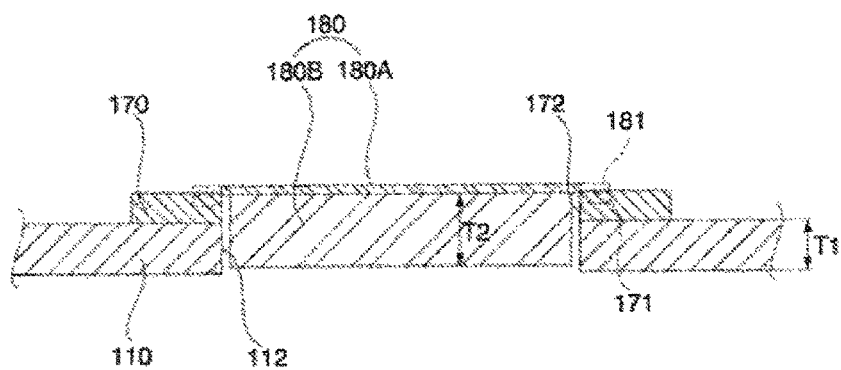
FIG. 6 is a cross-sectional view cut by line B-B shown in FIG. 5H.

As shown in FIG. 5G, the opening 172 formed in the sub PCB 170 has a diameter equal to or greater than that of the antenna assembly hole 112, and the antenna part 180 has a diameter enough to be inserted into the antenna assembly hole 112.

The sub PCB 170 sits on and is soldered to a circumference of the antenna assembly hole 112 in one side of the PCB 110 (that is, the top surface of the PCB in the drawing), and a pair of antenna terminal grooves 171 are formed in the opening 172 of the sub PCB 170 to oppose each other in a radial direction.

Meanwhile, the antenna part 180 includes: a lower body 180B; and an upper terminal part 180A covering the lower body 180B and having a diameter greater than that of the lower body 180B. A first antenna terminal 181, into which the pair of antenna terminal grooves 171 is inserted, may be formed on the circumference of the upper terminal part 180A to protrude by a predetermined length, and a pair of second antenna terminals 183 may be formed one side of the first antenna terminal 181 around the circumference of the upper terminal part 180A.

When the sub PCB 170 sits on and is soldered to the circumference of the antenna assembly hole 112, the antenna part 180 is moved at the right location into the opening 172 of the sub PCB 170 so that the antenna terminals 181 may be inserted into the antenna terminal grooves 171, respectively. In this case, the first antenna terminal 181 and the second antenna terminal 183 are electrically soldered to the sub PCB 170, so that the terminal part 180A of the antenna part 180 may be electrically connected to the PCB 110 with using the sub PCB 170 as a medium.

It is possible to solder the antenna part 180 directly to the PCB 110 without using the sub PCB 170 as a medium.

However, thickness of a commonly used antenna part 180 is greater than thickness T1 of the PCB 110, as shown in FIG. 6, and, if the antenna part 180 is soldered to one surface of the PCB 110, it may inevitably increase thickness of an entire wireless communication device 110.

If a commonly used antenna part is used without changing thickness thereof or without any modification, it is possible to reduce costs, and that is why the antenna assembly hole 112 is formed in the PCB 110 and why the antenna part 180 is coupled to the PCB 1110 to enable electrical connection with using the sub PCB 170 as a medium. That is, as the lower part 180B of the antenna part 180 is inserted into the antenna assembly hole 112, the antenna part 180 is prevented from protruding by a length as long as thickness of the PCB 110, and thereby, thickness of the slim smart card key 100 according to the present disclosure may be prevented from increasing.

The preference embodiment of the slim smart card key 100 according to the present disclosure is characterized in that, as shown in FIG. 2, the spare key settling part 140, the terminal assembly 130, and the antenna assembly 170 and 180 sit in and are soldered to respective coupling sites on the top of one surface of the PCB 110 (that is, one side of a top surface of the PCB 110 in the drawing) in the same direction. As such, the fact that the spare key settling part 140, the terminal assembly 130, and the antenna assembly 170 and 180 are assembled in the same direction may significantly reduce the number of intermediate processes for assembling the PCB assembly 101 before the PCB assembly 101 is inserted into a mold.

For example, in an automatic assembly line, the spare key settling part 140, the terminal assembly 130, and the antenna assembly 170 and 180 may be clamped to the top of one surface of the PCB 110 and then locationed at the same time for assembly, so that the number of intermediate processes may be significantly reduced.

More specifically, as shown in FIG. 3, the spare key settling part 150 includes: an upper plate 142 having upper portion settling parts 145 which protrude toward the top of the spare key receiving part 113 and bent downwardly on one side among directions orthogonal to a longitudinal direction of the spare key receiving part 113 and then extended in parallel; a lower plate 141 having lower portion settling parts 143d, 143e, and 143f which protrude toward the bottom of the spare key receiving part 113 and bent upwardly on one side among directions orthogonal to the longitudinal direction of the spare key receiving part 113 and then extended in parallel; and a connection plate 14 vertically connecting the upper plate 142, which corresponds to the other side among directions orthogonal to the longitudinal direction of the spare key receiving part 113, to one end of the lower plate 141, which corresponds More specifically, as shown in FIG. 4, the spare key settling part 140 has a cross section in the "▢" shape to have a rectangular inner space in which a spare key is accommodated. In addition, the spare key settling part 140 includes the upper portion settling part 145 and the lower portion settling parts 143d, 143e, and 143f, which are respectively disposed on the right, left, and central location in the drawing to protrude by a predetermined length. Detailed descriptions thereof are provided later.

As illustrated in FIG. 3, the spare key settling part may be formed such that the upper portion settling part 145 and the lower portion settling parts 143d, 143e, and 143f have the same height. That is, the spare key settling part 140 has one side one Meanwhile, for the cross-sectional view in the "☐" shape, part of the other end of the upper plate 142 is bent downwardly and then bent outwardly in parallel to form the upper portion settling part 145, and part of the other end of the lower plate 141 is bent upwardly and then bent outwardly in parallel to form the low settling parts 143d, 143e, and 143f.

The names of the upper portion settling part 145 and the lower portion settling parts 142d, 143, and 143f are not meant to limit locations of the components, but they simply mean that the components are formed by being extended from the upper plate 142 and the lower plates 141.

The upper portion settling part 145 and the lower portion settling parts 143d, 143e, and 143f are formed to simultaneously hang onto the top surface of a circumference of the spare key receiving part 113 that is formed in the PCB 110.

A plurality of upper portion settling parts 145 and a plurality of lower portion settling parts 143d, 143e, and 143f are provided at the same height, and one upper portion settling part 145 may be arranged between adjacent lower portion settling parts 143d, 143e, and 143e. Preferably, three lower portion settling parts 143d, 143e, and 143f formed in the lower plate 11 are spaced apart from each other, and each of two upper portion settling parts 145 formed in the upper plate 142 is disposed at an interval where the lower portion settling parts 143d, 143e, and 143f are spaced apart from each other.

Meanwhile, as shown in FIG. 3, the connection plate 14 may include side portion solders 143a, 143b, and 143c formed therein, which holds the spare key settling part 140 to the top surface of the circumference of the spare key receiving part 113 formed in the PCB 110.

In this case, the upper portion settling part 145, the lower portion settling parts 143d, 143e, and 143f, and the side portion settling parts 143a. 143b, and 143c simultaneously hold the spare key settling part 140 to the top surface of the PCB 110.

Each solder groove 143' or 145' for soldering to the top surface of the PCB 110 may be formed in each of the upper portion 145, the lower portions 143d, 143e, and 143f, and the side portion settling parts 143a, 143b, and 143c Meanwhile, as shown in FIG. 4, a plurality of location setting groove 115 for holding the spare key settling part 140 at a right location are provided in the PCB 110, and a downwardly-bent location setting protrusion 144a or 144b to be inserted into the location setting groove 115 may be formed at an end of the upper portion settling part 145. The location setting groove 115 and the location setting protrusion 114a or 114b prevent movement of the spare key settling part 140 and help the spare key settling part 140 to be soldered to a right location, hereby reducing a defect reduction of a product. In this case, the location setting aperture may be formed in the shape of not only a groove, but also a hole through which an epoxy molding material forming the body part 110 penetrates so as to streamline the flow of resin in the insert injection molding process.

As such, by the upper portion settling part 145, the lower portion settling parts 143d, 143e, and 143f, and the side portion settling parts 143a, 143b, and 143c, the spare key settling part 140 is moved toward the spare key receiving part 113 from the upper portion of the PCB 110, and then sits on a circumferential portion of the spare key receiving part 113 for soldering. By doing so, a number of processes for assembling the spare key settling part 140 in an existing technology is significantly reduced.

As shown in FIGS. 5A to 5D, the terminal assembly 130 may include: a first polarity terminal plate 133 which contacts a bottom contact surface (now shown) that is formed on a bottom surface of a battery inserted through the battery entrance hole 120; and a second polarity terminal plate 131 which contacts a top contact surface (now shown) that is formed on a top surface of the battery inserted through the battery entrance hole 120.

Once the first polarity terminal plate 133 and the second polarity terminal plate 131 are fixed onto the top surface of the PCB 110, a space into which a battery is inserted is formed between the first polarity terminal plate 133 and the second polarity terminal plate 131 (the space is a concept including the battery receiving part 120). Due to insertion of the battery into the space, the top surface and the bottom surface of the battery are simultaneously rendered contacting the top contact surface formed on the bottom surface of the first terminal plate 133 and the bottom contact surface formed on the top surface of the second polarity terminal plate 131, respectively.

Each of the first polarity terminal plate 133 and the second polarity terminal plate 131 has a width narrower than that of the battery receiving part 111, and a plurality of leg members, which are coupled to the top surface of the PCB 110 in surroundings of the battery receiving part 111, may be formed on an outer surface of each of the first polarity terminal plate 133 and the second polarity terminal plate 131. For convenience of explanation, a plurality leg members formed on the first polarity terminal plate 133 is referred to as first leg members 133a to 133d, and a plurality of leg members formed on the second polarity terminal plate 131 are referred to as seond leg members 131a to 131d.

One side of the first leg members 133a to 133d and one side of the second leg members 131a to 131d sit on the top surface of one side 144a of the PCB 110, which forms the battery receiving part 111, and the other side of the first leg members 133a to 133d and the other side of the second leg members 131a to 131d sit on the top surface of the other side 114b of the PCB 110, which forms the battery receiving part 111.

The first leg members 133a to 133d and the second leg members 131a to 131d have the same height as that of the upper portion settling part 145 and the lower portion settling parts 143d, 143e, and 143f, which are respectively formed on the upper plate 142 and the lower plate 141 of the spare key settling part 140, so that the first leg members 133a to 133d and the second leg members 131a to 131d sit on the top surface of the PCB 110. That is, the first polarity terminal plate 133 is arranged in parallel with the PCB 110 and locationed below the bottom surface of the PCB 110, while the first leg members 133a to 133d are bent to sit on the top surface of the PCB 110. In addition, the second polarity terminal plate 131 is arranged in parallel with the PCB 110 and locationed above the top surface of the PCB 110, while the second leg members 131a to 131d sits on the top surface of the PB 110 at the same height as that of the first leg members 133a to 133d. Sitting on the top surface of the PCB 110, the first leg members 133a to 133d, and the second leg members 131a to 131d are soldered on the top surface of the PCB 110.

A first polarity connecting protrusion 134 protruding upward may be formed on the top surface of the first polarity terminal plate 133 to easily connect the bottom contact surface of a battery, and a second polarity connecting protrusion 132 protruding downward may be formed on the bottom surface of the second polarity terminal plate 131 to easily connect the top contact surface of the battery. A plurality of first polarity connecting protrusions 134 and a plurality of second polarity connecting protrusions 132 may be formed in spaced-apart relation to each other.

Manufacturing and assembling process for the preferable embodiment of the slim smart card key 100 according to the present disclosure are hereinafter described with reference to accompanying drawings (especially, FIGS. 5A to 5H).

First, an electronic component is soldered to a top surface of the PCB 110. For convenience of explanation, a portion to which the electronic component is soldered is referred to as the top surface of the PCB 110, and a surface opposite to the top surface is referred to as a bottom surface of the PCB 110.

Then, the spare key settling part 140 is moved directly from above a portion where the spare key receiving part 114 is formed on the top surface of the PCB 110 to which the electronic component is soldered, so that the spare key settling part 140 sits on the top surface of the PCB 110. In this case, the upper portion settling part 145, the lower portion settling parts 143*d*, 143*e*, and 143*f*, and the side portion settling parts 143*a*, 143*b*, and 143*c* of the spare key settling part 140 sit on the top surface of the PCB 110 in surroundings of the spare key receiving part 113. Sitting on the top surface of the PCB 110, as described above, the spare key settling part 140 is soldered.

Then, the terminal assembly 130 and the antenna assembly 170 and 180 sit on the top surface of the PCB 110 in a direction as the same as a direction in which the spare key settling part 140 is assembled, and then the terminal assembly and the antenna assembly 170 and 180 are soldered.

In the above-described embodiment of the slim smart card key 100 according to the present disclosure, the electronic component, the spare key settling part 140, the terminal assembly 130, and the antenna assembly 170 and 180 are moved in the same direction to sit on and be fixed onto the top surface of the PCB 110. By doing so, an assembler may assemble components with shorter time, and an additional automatic system may be established to complete the PCB assembly 101, so that the number of intermediate processes may be significantly reduced and less labor costs may be needed.

Hereinafter, there are provided embodiments in which a switching unit for applying an active RKE function is included in a slim smart card key for a vehicle according to the present disclosure. To clearly distinguish each embodiment of a switching unit, a different numeral reference is used to indicate the same component in each embodiment. It is understood that each component has the same function within an overlapping range: however, a function of a component indicated by the same numeral reference but described differently needs to be understood as an additional function of the component.

The first embodiment of a switching unit for applying an RKE function to a slim smart card key for a vehicle according to the present disclosure is described as below.

Figure 7:
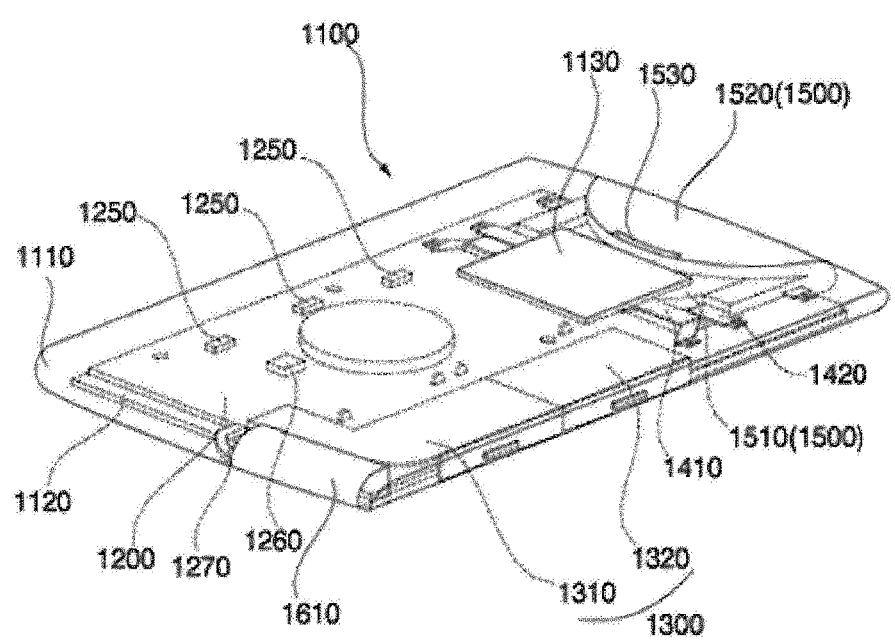
FIG. 7 is a perspective view illustrating a slim smart card key for a vehicle according to the present disclosure, wherein a switching unit according to a first embodiment is applied the slim smart card key.
Figure 8:
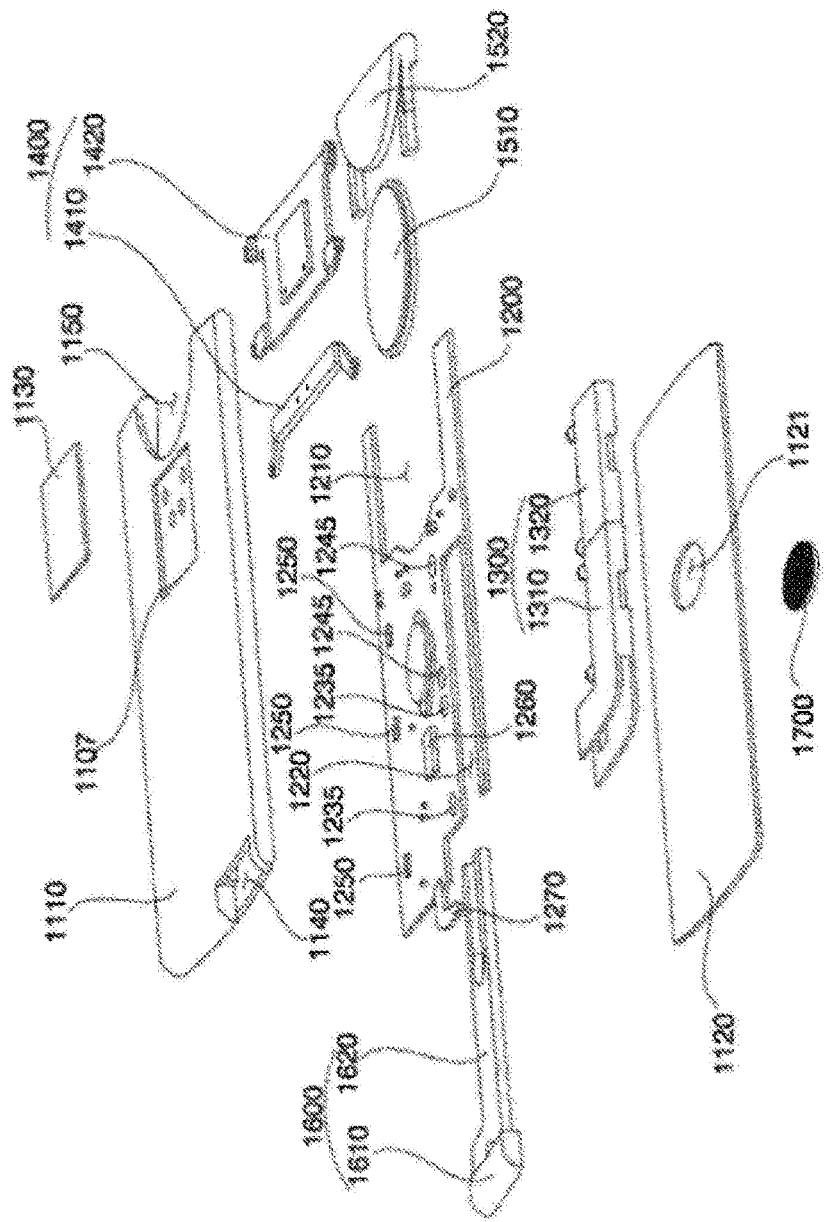
FIG. 8 is an exploded perspective view illustrating a slim smart card key for a vehicle according to an embodiment of the present disclosure.
Figure 9:
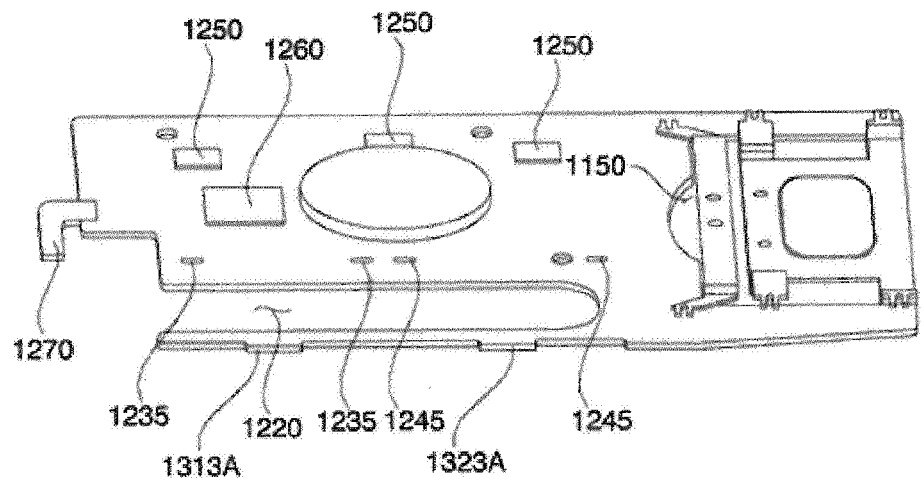
FIG. 9 is a perspective view illustrating part of a PCB that is one of components shown in FIG. 7.
Figure 10:
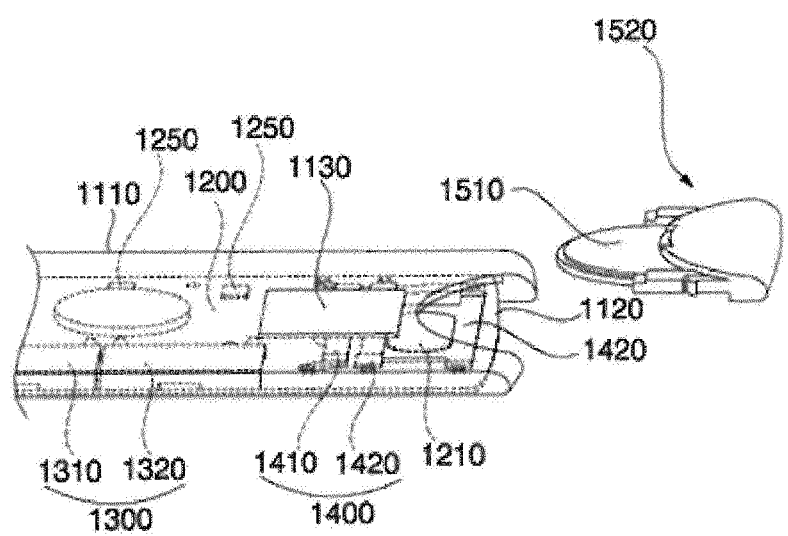
FIG. 10 is a perspective view illustrating part of a slim smart card key for a vehicle according to an embodiment of the present disclosure.

FIG. 7 is a perspective view illustrating a slim smart card key for a vehicle according to the present disclosure, wherein a switching unit according to a first embodiment is applied to the slim smart card key; FIG. 8 is an exploded perspective view illustrating a slim smart card key for a vehicle according to an embodiment of the present disclosure; FIG. 9 is a perspective view illustrating part of a PCB that is one of components shown in FIG. 7; and FIG. 10 is a perspective view illustrating part of a slim smart card key for a vehicle according to an embodiment of the present disclosure Referring to FIGS. 7 to 10, a slim smart card key 1100 for a vehicle according to an embodiment of the present disclosure includes: spare key 1600 having a magnetic 1611 provided on one side of the spare key 1600; a PCB 1200 having a hall sensor 1250, which is provided on one side of the PCB 1200 and able to be switched on due to a magnetic force of the magnetic 1611, and a spare key receiving part 1220 which is provided on the other side of the PCB 1200 and in which the spare key 1600 is accommodated; and a body 1110 having a spare key entrance hole 1140 which is formed at a location corresponding to the spare key receiving part 1220.

A spare key entrance hole 1140 through which the spare key 1600 is inserted into and out is formed in the body 1110 at a location corresponding to the spare key receiving part 1220. In addition, the spare key entrance hole 1140 is coupled to a handle portion 1610 of the spare key 1600 to close the spare key entrance hole 1140. Furthermore, a battery entrance hole 1150 through which a battery 1510 is inserted into and out is formed in the body 1110 at a location corresponding to a battery receiving part 1210.

The body 1110 is injection-molded with the PCB 1220 inserted therein, and it is preferable that the injection molding process is implemented such that a top surface and a bottom surface of the PCB 1200 are spaced apart at a predetermined distance from a top surface and a bottom surface of the body 1110, respectively. This is to prevent an external physical force from being delivered directly to the PCB 1200, thereby preventing damage of the PCB 1200.

The body 1110 is insert-injection molded with the PCB 1200 being inserted into a mold (not shown). Accordingly, the body 1110 defines the outer appearance of the slim smart card key 1100.

The reason that the body 1110 is injection molded with the PCB 1200 inserted into the mold is to resolve inconvenience that an assembler encounters to perform a number of intermediate assembling processes, which is pointed out as a drawback of an existing PCB 1200 that is manufactured in a manner where an additional space for installing the existing PCG 1200 is provided between an upper cover and a lower cover and then the upper and lower covers are coupled to complete a final product. In particular, the existing assembling process does not utilize an injection molding process, and thus, it does not need an additional mold for insert-injection molding the body 1110. However, it may lead to inconvenience to an assembler, weaken combination between the upper and lower covers, and expose a final product to damage due to an external force when a user carries the product.

Meanwhile, in the case of the slim smart card key 1100 according to the present disclosure, the injection molding process is performed with the PCB 1200 being inserted into a mold, so that the number of intermediate processes for coupling individual components may be reduced, the need of an additional mold for upper and lower covers may be removed since it is not necessary to manufacture the two separate covers, and hardness of a final product may improve since a thermosetting resin material is adapted as a material for the body 1110, which is a molding material. In this embodiment, the body 1110 is molded with epoxy resin. In addition, the spare key entrance hole 1140 and the battery entrance hole 1150 are formed when the body 1110 is injection molded by a mold.

When the body 1110 is injection molded, it is necessary to support the first and second polarity terminals 1410 and 1420, which are provided on the PCB 1200, not to be moved in the injection molding process. To this end, a mold includes: a supporting rib (not shown) which protrudes to the top surfaces of the first polarity terminal 1410 and the second polarity terminal 1420; and a support hole (not shown) which is formed such that from the top surface of the body 1110 to the first and second polarity terminals 1410 and 1420 is penetrated by the supporting rib (not shown) after the body 1110 is injection molded. If the support hole (not shown) is exposed from the outside 1110, it may degrade the outer appearance, so the support hole (not shown) is formed as a supporting groove 1107 which is formed on the surface of the body 1110 in a deted manner and which is closed by an upper deco 1130.

In this case, it is preferable that the body part 110 is a lengthwise plate having a predetermined thickness. In particular, the body part 110 may be a thing plate which has the same size of that of an ordinary credit card so as to be easily carried within a wallet or a back for the sake of mobility, and which has a thickness equal to or less than 3.4 mm. In addition, it is preferable that even the PCB 1220 accommodated inside the body 1110 is formed as a lengthwise plate.

The PCB 1200 is a board in which a circuit (not shown) is printed on a plastic object, and an electronic component is assembled or soldered to the PCB 1200 for electrical connection of the circuit and for generation of various signals in accordance with predetermined operation signals. The PCB 1200 communicates with a device installed in a vehicle to operate the device. In this embodiment, the device installed in a vehicle may include a door, a trunk, an emergency light, and the like.

One side of the PCB 1200 is cut to form a spare key receiving part 1220 in which the spare key 1600 is accommodated when being inserted inwardly from the outside. The spare key receiving part is in the shape corresponding to the inserted spare key 1600. Therefore, the spare key receiving part 1220 is formed long in a longitudinal direction, just like the general shape of a key. In addition, it is preferable that the spare key receiving part 1220 is larger than the spare key 1660, so that the spare key 1600 is arranged separately in the spare key receiving part 1220. It is to prevent the spare key 1600 from delivering a shock to the PCB 1200 when the spare key 16000 is inserted.

The PCB 1200 includes a spare key settling part 1200 that forms a space in which the spare key 1600 coupled to the spare key receiving part 1220 is inserted. When the spare key 1600 is inserted into the spare key receiving part 1220, the spare key settling part 1300 prevents the spare key from moving. Therefore, the spare key settling part 1300 may prevent that a physical shock is delivered to the PCB 1200 due to movement of the spare key 1600 accommodated in the spare key receiving part 1220.

The PCB 1200 is cut to form a battery receiving part 1210 in which a battery 1510 is accommodated when being inserted inwardly from the outside. The battery receiving part 1210 is in a shape corresponding to the battery 1510 inserted into the battery receiving part 1210. In this embodiment, the battery 1510 is in a circular shape, and the battery receiving part 1210 is in a semi-circular shape. The battery receiving part 1210 is formed on the other side that opposes the spare key receiving part 1220.

The spare key receiving part 1220 and the battery receiving part 1210 are not necessary formed in a cutting manner, and may be formed in an injection molding process in which the PCB 1200 is injection molded The PCB 1200 includes a hall sensor 1250 which is provided on one side of the PCB 1200 and switched on due to a magnetic force of a magnetic 1611. A plurality of hall sensors 1250 are provided, and, in this embodiment, three hall sensors 1250 are provided to perform switching functions of locking a door, opening the door, and opening a trunk. However, in another embodiment of the present disclosure, an additional hall sensor 1250 for igniting an engine of a car may be further included.

A hall sensor 1250 is a sensor that senses direction and size of a magnetic field by using a hall effect indicating a phenomenon where a voltage is produced in a direction perpendicular to a current and a magnetic field once the magnetic field is applied to a conductor in which the current flows. The hall sensor 1250 consists of a Hall integrated circuit (IC) sensor that is a sensor in which a hall element, a differential amplifier, an output, and the like are integrated onto the same substrate. It is preferable that the hall sensor 1250 is located far distant from the spare key receiving part 1220 into the spare key 1600 is inserted, because the hall sensor 1250 is influenced by a magnetic field. In this embodiment, the hall sensor 1250 is provided, opposing the spare key receiving part 1220.

If the magnetic 1611 is put on the hall sensor 1250, the hall sensor 1250 is turned ON and the PCB 1200 transmits an output signal to a device installed in a vehicle. In response to receipt of the output signal, the device installed in a vehicle locks a door, opens the door, or opens a trunk. In addition, letters indicating a function being performed by the hall sensor 1250 is printed at a location corresponding to the hall sensor 1250 in the body 1110. In this embodiment, "LOCK" indicative of locking a door, "UNLOCK" indicative of opening a door, and "TRUNK" indicative of opening a trunk are printed. However, what is printed is not necessarily letters; instead, a diagram or an image conforming to each function may be printed.

A movement detecting sensor 1260 provided on one side of the PCB 1200, and the movement detecting sensor detects movement the body 1110, of which a degree is equal to or greater than a predetermined level. If a user moves the slim smart card key 1100 with a force equal to or greater than the predetermined level, the movement detecting sensor 1260 detects the movement and transmits an output signal to the device installed in the vehicle. In response to receipt of the output signal, the vehicle may perform a function of notifying a user of a location of the vehicle by operating a horn or an emergency light.

A coupler 1270 of steel is provided at a location on the PCB 1200 which corresponds to the magnetic 1611 of the spare key 1600 when the spare key 1600 is inserted into the spare key receiving part 1220. Accordingly, the magnetic 1611 of the spare key 1600 is coupled to the coupler 1270 due to a magnetic force, so that the spare key 1600 may not be easily detached. The coupler 1270 may be assembled or soldered to be fixed onto the PCB 1200. In this embodiment, the magnetic 1611 of the spare key 1600 is provided inside the handle portion 1610. Accordingly, the coupler 1270 is provided at one side end of the spare key entrance hole 140 and bent toward the magnetic 1611.

The PCB 1200 includes: a space into which the battery coupled to the battery receiving part 1210 is inserted; and a terminal assembly 1400 which contacts the battery 1510 to apply power from the battery 1510 to the electronic component provided on the PCB 1200.

In addition, location setting protrusions 1313A and 1323A, which are horizontally inserted into location setting holes (not shown) formed in the spare key settling part 1300, are formed on the PCB 1200. Accordingly, the spare key settling part 1300 may be strongly coupled to the PCB 1200.

The terminal assembly 1400 includes: a first polarity terminal 1410 that is in contact with a top surface of the battery 1410 inserted into the battery receiving part 1210 so as to allow a current to flow; and a second polarity terminal that is in contact with a bottom surface of the batter 1510 inserted into the battery receiving part 1210 so as to allow a current to flow. When the battery 1510 is inserted into the battery receiving part 1210, the first polarity terminal 1410 and the second polarity terminal 1420 are put in contact with the top surface and the bottom surface of the battery 1510 to supply power to the slim smart card key 1100.

Both ends of the first polarity terminal 1410 are coupled to the top surface of the PB 1200. A middle portion of the first polarity terminal 1410 is bent toward the top of the battery receiving part 1210, while crossing the battery receiving part 1210. In addition, both ends of the second polarity terminal 1420 are coupled to the top surface of the PCB 1200. A middle portion of the second polarity terminal 1420 is bent toward the bottom of the battery receiving part 1210 while crossing the battery receiving part 1210.

The first polarity terminal 1410 is bent toward the top of the battery receiving part 1210, and the second terminal 1420 is bent toward the bottom of the battery receiving part 1210. Therefore, a space into which the battery 1510 is able to be inserted is formed between the first polarity terminal 1410 and the second polarity terminal.

In this embodiment, it is preferable that the second terminal 1420 is larger than the first polarity terminal 1410. It is to more stably support the battery 1510. However, in another embodiment of the present disclosure, the first polarity terminal 1410 may be larger in size than the second polarity terminal 1420 or both of the first polarity terminal 1410 and the second polarity terminal 1420 may have the same size.

Referring to FIG. 8, when the body 1110 is insert-injection molded, one end of the battery entrance hole 1150 formed in the body 1110 is cut out vertically. A deco panel 1120 is coupled to the bottom surface of the body 1110 to close the bottom of the cut-out battery entrance hole 1150. In this case, the deco panel 1120 is a component that is molded separately from the body 1110 and coupled to the body 1110. A coupling hole to which a symbol 1700 of each manufacturer may be formed in the deco panel 1120. In addition, an upper deco 1130 is coupled to the top surface of the body 1110, and a battery cover 1520 includes a coupler to which the battery 1510 is detachably coupled. With the battery 1510 being coupled to the coupler, the battery cover 1520 allows the battery 1510 to be inserted into the battery receiving part 1210 through the battery entrance hole 1150. In addition, the battery cover 1520 closes the battery entrance hole 1150. A combination between the battery cover 1520 and the battery 1510 is referred to as a battery assembly 500.

Meanwhile, the spare key entrance hole 1140 formed in the body 1110 and the spare key receiving part 1220 formed in the PCB 1200 communicate each other to allow the spare key 1600 to be inserted from the outside and accommodated. In addition, the battery entrance hole 1150 formed in the body 1110 and the battery receiving part 1210 formed in the PCB 1200 communicate each other to allow the battery 1510 to be inserted from the outside and accommodated.

In this embodiment, the spare key receiving part 1220 and the battery receiving part 1210 are respectively formed on the two ends of the PCB 1200. Therefore, the spare key entrance hole 1140 and the battery entrance hole 1150 are respectively formed on the two ends of the body 1110, which correspond to the spare key receiving part 1220 and the battery receiving part 1210.

The PCB 1220 includes: vertically hollow hang holes 1235 and 1245; and a spare key settling part 1300 which is coupled to cover the top and the bottom of the spare key receiving part 1220. The spare key settling part 1300 includes hang pins 1315 and 1325 which penetrate and hang onto the hang holes 1235 and 1245, and, as the hang pins 1315 and 1325 hang onto the hang holes 1235 and 1245, the spare key settling part 1300 is coupled to the PCB 1200. Therefore, when the body 1110 is formed in the injection molding process, it is possible to protect movement between the spare key settling part 1300 and the PCB 1200. The spare key settling part 1300 may be made of an elastic material of high hardness.

Figure 11:
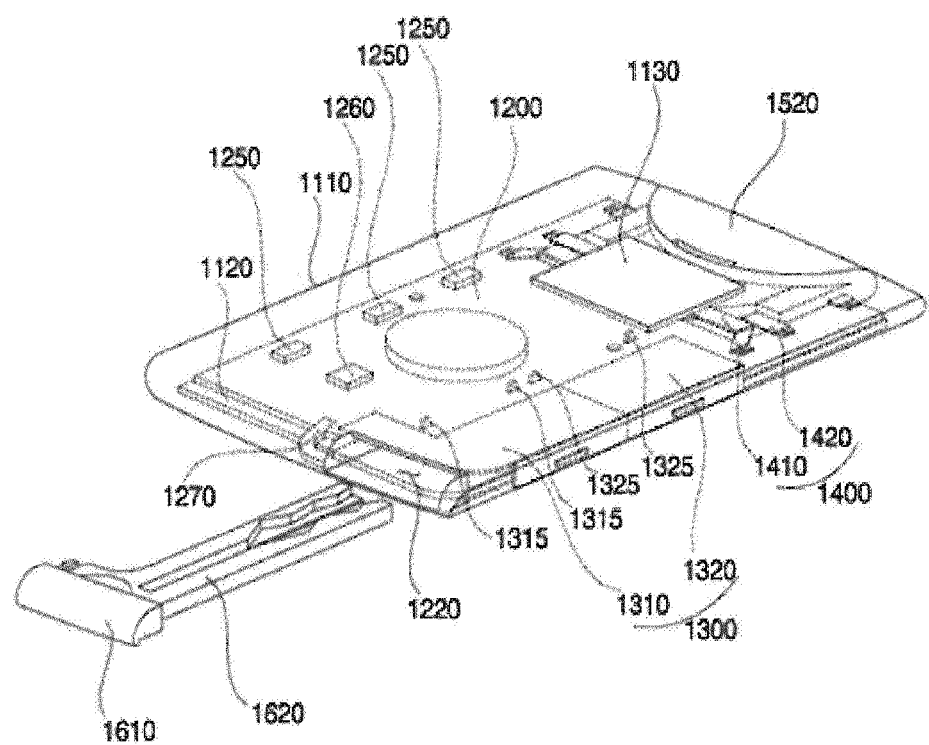
FIG. 11 is a diagram illustrating a case where a spare key is separate from a slim smart card key for a vehicle according to an embodiment of the present disclosure.
Figure 12:
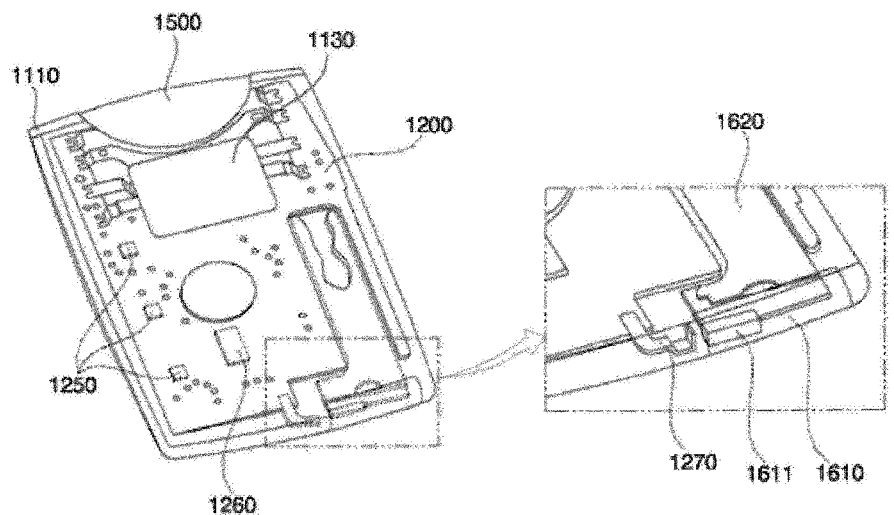
FIG. 12 is a diagram illustrating a bottom surface of a slim smart card key for a vehicle according to an embodiment of the present disclosure.

FIG. 11 is a diagram illustrating a case where a spare key is separate from a slim smart card key for a vehicle according to an embodiment of the present disclosure; and FIG. 12 is a diagram illustrating a bottom surface of a slim smart card key for a vehicle according to an embodiment of the present disclosure.

Referring to FIGS. 11 and 12, a spare key 1600 includes a handle portion 1610 formed at one end thereof to allow a user to hold the spare key 1600. The handle portion 1610 is a portion which the user is able to hold with his or her hand and using which the user detaches the spare key 1600 from a slim smart card key 1100 for a vehicle or couples the spare key 1600 to the slim smart card key 1100. The spare key 1600 is considered to indicate the shape of a car key 1612.

A magnetic 1611 is provided within the handle portion 1610. When the spare key 1600 is inserted into a spare key settling part 1300 through a spare key entrance hole 1140, the magnetic 1611 is coupled to a steel coupler 1270, which is coupled to a PCB 1200, due to a magnetic force. Therefore, the spare key 1600 may be coupled to the slim smart card key 1100 and may not be easily detached from the slim smart card key 1100. The magnetic 1611 is insert molded in the handle portion 1610, and provided at a location corresponding to the coupler 1270.

It is desirable that the handle portion 1610 is formed to match the outer appearance of the body 1110 since the handle portion 1610 closes the spare key entrance hole 1140 when the spare key 1600 is inserted into the spare key settling part 1300.

The spare key 1600 is inserted into the spare key settling part 1300 through the spare key entrance hole 1140. In addition, a key receiving part is formed on the surface of the spare key 1600. Generally, the spare key 1600 is used as a door, trunk, or engine key in an emergency situation, such as when the slim smart card key 1100 is broken or the battry 1510 is run out.

In the following, a switching unit of the slim smart card key 1100 according to the present disclosure is described with reference to accompanying drawings (especially, FIG. 13).

Figure 13:
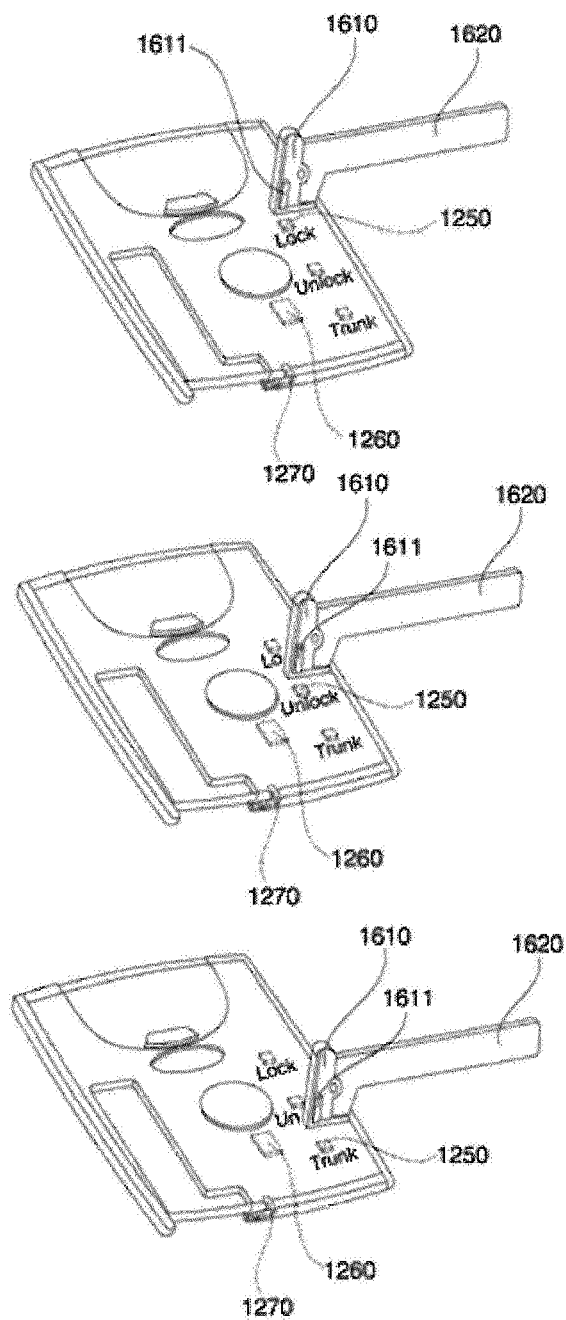
FIG. 13 is a perspective view illustrating a method of operating a slim smart card key for a vehicle according to an embodiment of the present disclosure.

FIG. 13 is a perspective view illustrating a method of operating a slim smart card key for a vehicle according to an embodiment of the present disclosure.

First, a user pulls a handle portion 1610 of a spare key 1600 with a force greater than a predetermined level to detach the spare key 1600 from the body 1110. A magnetic 1611 provided in the detached spare key 1600 is put on a body 1110 in which a hall sensor 1250 performing a desired function among a door opening function and a trunk opening function. At this point, the hall sensor 1250 is turned ON due to a hall effect, and the slim smart card key 1100 transmits an output signal to the vehicle. The vehicle receives the output signal and performs a function corresponding to the output signal.

The functions of the slim smart card key 1100 in this embodiment are only a door opening function and a trunk opening function, but the slim smart card key 1100 may perform an engine igniting function in another embodiment of the present disclosure.

After implemented a desired function of the slim smart card key 1100, the user inserts the spare key 1600 into a spare key settling part 1300 through a spare key entrance hole 1140. Once the spare key 1600 is inserted, the magnetic 1611 provided in the handle portion 1610 is coupled to a steel coupler 1270 due to a magnetic force. Therefore, the spare key 1600 may not be easily detached from the body 1110.

In addition, a movement detecting sensor 1260 is provided in the PCB 1200. If the movement detecting sensor 1260 detects movement of the slim smart card key 1100 greater than a predetermined level, he movement detecting sensor 1260 causes the slim smart card key 1100 to transmit a predetermined output signal to the vehicle. In response to receipt of the output signal, the vehicle operates a horn/emergency light to notify a user of a location of the vehicle. However, other embodiments, in which a function of opening a door or trunk is performed in accordance with the predetermined output signal transmitted due to the movement detecting sensor 1260, are also possible.

Hereinafter, the second embodiment of a switching unit for applying an RKE function to a slim smart card key for a vehicle according to the present disclosure is described in detail.

Figure 14:
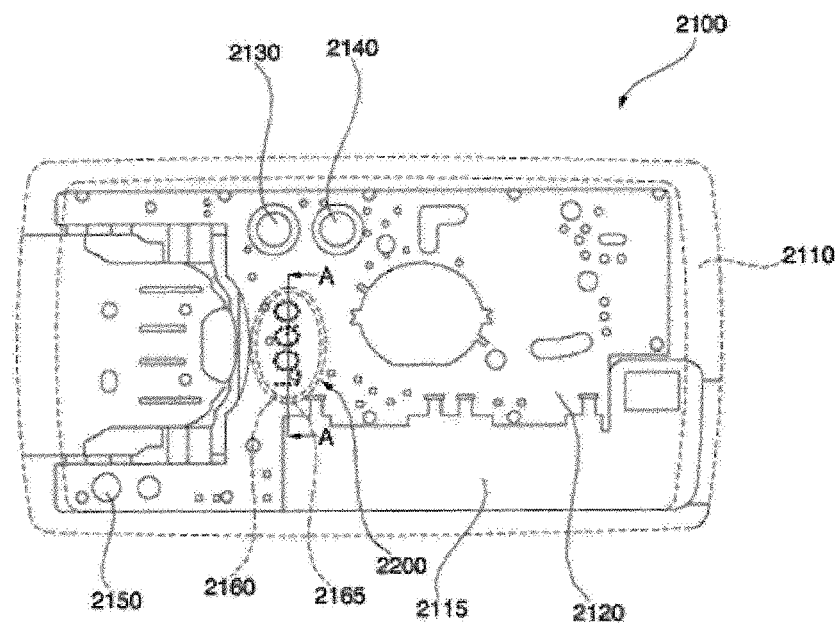
FIG. 14 is a perspective view illustrating a slim smart card key for a vehicle according to the present disclosure, wherein a switching unit according to the second embodiment of a switching unit is applied to the slim smart card key.
Figure 15:
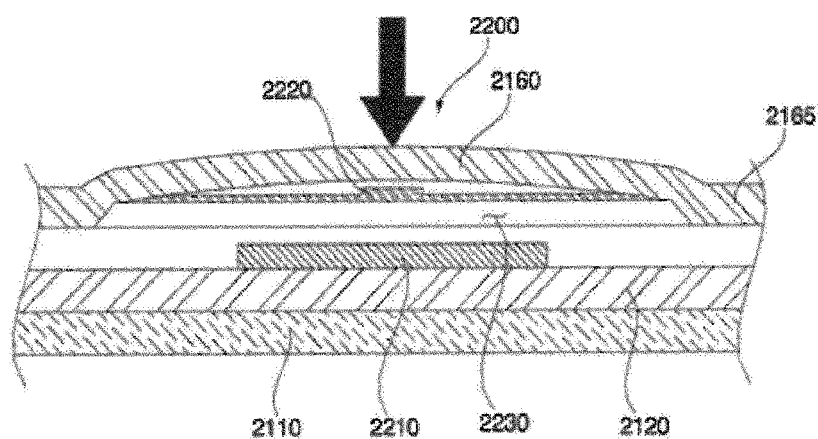
FIG. 15 is a cross-sectional view cut by line A-A shown in FIG. 14.
Figure 16:
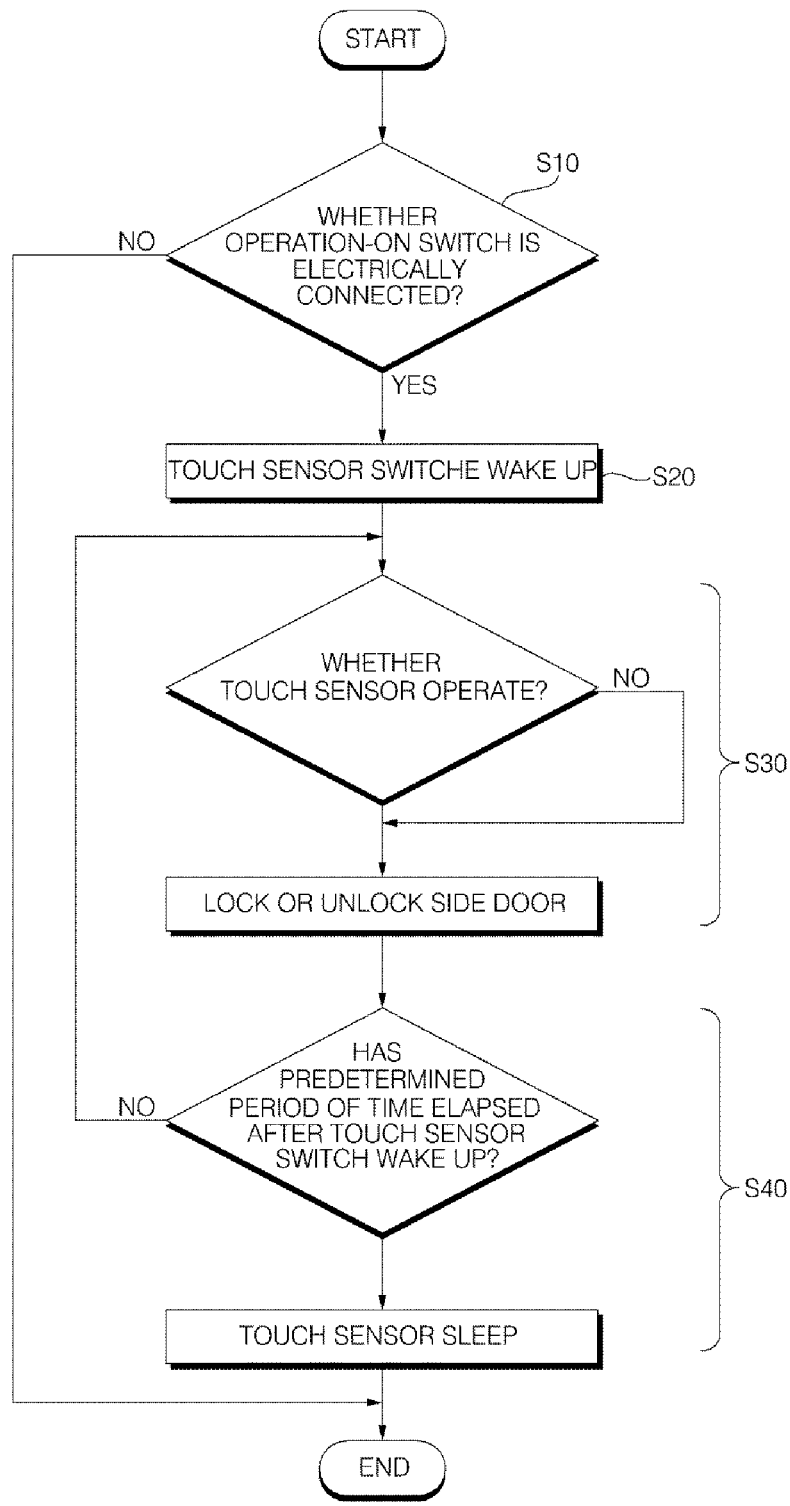
FIG. 16 is a control block diagram illustrating a control flow of a slim smart card key for a vehicle according to the present disclosure.

FIG. 14 is a perspective view illustrating a slim smart card key for a vehicle according to the present disclosure, wherein a switching unit according to the second embodiment of a switching unit is applied to the slim smart card key; FIG. 15 is a cross-sectional view cut by line A-A shown in FIG. 14; and FIG. 16 is a control block diagram illustrating a control flow of a slim smart card key for a vehicle according to the present disclosure.

The preferred embodiment of a slim smart card key 2100 for a vehicle according to the present disclosure includes: a body 2110 of which outer appearance is molded as a molding material is hardened due to the insert injection molding process; a PCB 2120 to which various electronic components are soldered before the insert injection molding process and which is disposed inside the body 2110 when the body 2110 is molded in the insert injection molding process; a plurality of touch sensor switches 2130 and 2140 which are soldered to the PCB 2120 before the body 2110 is molded, and which generates a predetermined electrical signal when a user touches a specific portion on an outer surface of the body 2100 after the body 2110 is molded; and a logo panel 2160 which is coupled to one surface of the body 2100 in a manner where a user is able to push the logo panel 2160 and which visually provide predetermined information.

The logo panel 2160 may be a manipulation knob 2160 of an operation-on switching unit 2200 which wakes up the plurality of touch sensor switches 2130 and 2140. Detailed descriptions thereof are provided later.

Herein, the body 2110 is formed as a molding material is hardened, as described as above; specifically, the body 2100 is formed in an insert injection molding process in which, after various electronic components are soldered to the PCB 2120, the PCB 2120 is arranged in a mold frame, which is not shown in the drawings, between a lower mold and an upper mold, and the molding material is poured into the mold frame and then hardened.

It is desirable that the molding material consists of an epoxy resin material in terms of hardness and weight. If the molding material is poured into the a mold frame between the lower mold and the upper mold, the entire surfaces of the PCB 2120 including top and bottom surfaces thereof are filled with the molding material, and thereby, the body 2110 is formed in the same shape of the mold frame. The slim smart card key 2100 according to the present disclosure is provided with the purpose of manufacturing a slim-type card key 2100, and thus, it is desirable that thickness of the body 2110 is not greater than 3.4 t.

Meanwhile, in a case where the body 2110 is formed in the longwise shape, a portion having a short edge (length) is called one short side edge or the other short side edge, and a portion having a long edge is called one long side edge or the other long side edge.

A spare key receiving part is formed close to one long side edge of the body 2110 so that a spare key is inserted from one short side edge toward the other short side edge. The spare key receiving part is formed by a spare key holding plate 2115 which is soldered to the PCB 2120 before the body 2110 is inserted molded with the molding material, Of course, an inserting block may be used to prevent the molding material from flowing into the spare key receiving part.

The plurality of touch sensor switches 2130 and 2140 may include: a lock switch 2130 which generates an electrical signal to lock a side door of the vehicle; and an unlock switch 2140 which generates an electrical signal to unlock a side door of the vehicle. Furthermore, a trunk door switch (not shown) and a panic switch (now shown) may be further added: the trunk door switch unlocks a trunk door of the vehicle according to an operation order of the lock switch and the unlock switch, and the panic switch generates warning sound in an emergency situation. However, in the preferable embodiment of the present disclosure, the two touch sensor switches 2130 and 2140 may be controlled to perform different functions according to an appropriate operation status and order. Detailed descriptions thereof are provided later.

The plurality of touch sensor switches 2130 and 2140 are a kind of an electrostatic touch switch, and generates the electrical signal in response to a user's finger touch. One preferable embodiment of the present disclosure aims to manufacture the slim-type card key 2100, so push-type switches may increase thickness and thus is not adapted, and the aforementioned touch-type switches are applied so that an RKE function may be added without increasing thickness.

The plurality of touch sensor switches 2130 and 2140 include a touch sensor to enable the aforementioned touch switch-type operation. The touch sensor indicates a sensor which detects static electricity or predetermined-level pressure delivered from a user's finger and generates a predetermined electrical signal.

Meanwhile, one preferable embodiment of a slim smart card key for a vehicle according to the present disclosure may further include a display unit 2150 which is coupled to the PCB 2120 before the body 2110 is molded, and which visually displays whether a Remote Keyless Entry (RKE) function is being operated or displays an operation state of the RKE function according to operation of the plurality touch sensor switches 2130 and 2140 or the operation-on switching unit 2220.

Herein, the display unit 2150 visually displays, for a user, information as to whether the operation-on switching unit 2200 operates so that the plurality of touch sensor switches 2130 and 2140 are waken up and whether the plurality of touch sensor switches 2130 and 2140 operate to perform a door locking function for locking a side door of the vehicle, a door unlocking function for unlocking the side door of the vehicle, a trunk locking function, for locking a trunk of the vehicle, or a panic function.

More specifically, if the operation-on switching unit 2200 operates and, in turn, the plurality of touch sensor switches 2130 and 2140 are waken up, a first color light is turned on; if the lock switch 2130 out of the plurality of touch sensor switches 2130 and 2140 operates, a second color light is turned on; and if the unlock switch 2140 among the plurality of touch sensor switches 2130 and 2140 operates, a third color light is turned on, and, in this manner, it is possible to distinguishabley display whether operation of each touch sensor switch is performed or an oeration status of each touch sensor switch.

The display unit 2150 may be provided as a Light Emitting Display (LED) (e.g., an Organic Light Emitting Display (OLED)) which irradiates light with different types of color, as described above.

Meanwhile, the plurality of touch sensor switches 2130 and 2140 are formed close to the other long side edge that opposes the one long side edge of the body 2110 in which the spare key receiving part is formed, and the display unit 2150 is formed close to the other short side edge that opposes the one short side edge in which the spare key receiving part is formed.

In addition, the operation-on switching unit 2200 may further include the manipulation knob 2160, and a switch contactor 2210 which is soldered to the PCB 2120 before the body 2110 is molded.

As described above, the manipulation knob 2160 may be indicated by the same numeral reference as that of the logo panel 2160 that is coupled to one surface of the body 2110.

The logo panel 2160 generally indicates a mark (symbol) of a manufacturer, and, in the case of the slim smart card key 2100 according to the present disclosure, the body 2110 is molded with a molding material, so that the logo panel 2160 is not provided directly in the body 2110, but in part of an additional deco sheet 2170 that is attached to one surface of the body 2110 to improve the outer appearance.

More specifically, as illustrated in FIG. 15, the logo panel 2160 may be integrated with the deco sheet 2170 and formed as a convex surface which gently protrudes outwardly from the body 2110.

As described above, the logo panel 2160 is desirably made of an elastic material so that a push operation is possible by a user's finger.

Between the logo panel 2160 and the switch contactor 2210, a contact pad 2220 may be further included, which is put close to the switch contactor in response to push operation of the logo panel 2160 to thereby connect the switch contactor 2210. Herein, it is desirable that the body 2110 is molded to form a specific contact space 2230 not filled with the molding material so that electrical connection may be established due to movement of the contact pad 2220.

The switch contactor 2210 may be a metal material of specific thickness, which is coupled not only to a general electric circuit printed directly on one surface of the PCB, but also to the PCB so that additional electrical connection is easily established by the operation-on switching unit 2200.

More specifically, the switch contactor 2210 may be a silver alloy or a gold alloy that is coupled to the PCB 2120.

In addition, the switch contactor 2210 may be a completion-type switch module soldered to the PCB 2120. The completion-type switch module may be a dorm-type switch of a conductive material Meanwhile, on a circumference of the logo panel 2160, an error operation preventive touch unit 2165 may be provided, which is to detect static electricity from a user when the user pushes the logo panel 2160.

The error operation preventive touch unit 2165 prevents the plurality of touch sensor switches 2130 and 2140 from waking up in response to the logo panel 2160 that mistakenly operates as a manipulation knob when a user carries or keeps the card key 2100 in a picket or a bag.

That is, the error operation preventive touch unit 2165 is able to prevent an error by detecting static electricity transferred from a finger of the user Prevention of an error operation by the above-described error operation preventive touch unit 2165 leads to preventing unnecessary battery consumption of the card key 2100.

According to one preferable embodiment in which a slim smart card key for a vehicle according to the present disclosure is provided with the above-described configurations, the slim-type card key 2100 further includes a function unit, which is able not only to perform an immobilizer function, but also to actively perform an RKE function, thereby improving user convenience.

Hereinafter, a control method of a slim smart card key for a vehicle according to the present disclosure is described in detail, wherein the slim smart card key includes the second embodiment of a switching unit.

A control method for a slim smart card key for a vehicle according to the present disclosure may be achieved more specifically when all components of a slim smart card key 2100 for a vehicle according to the present disclosure are satisfied.

As shown in FIG. 16, one preferable embodiment of a control method of a slim smart card key for a vehicle according to the present disclosure includes: determining whether the operation-on switching unit 2200 is electrically connected in step S10; in response to a determination made in step S10 that electrical connection is established, waking up the plurality of touch sensor switches 2130 and 2140 in step S20; after step S20, performing an RKE function to lock or unlock a side door of a car in step S30 according to whether a touch sensor operates; and if a predetermined period of time has passed after step S20, causing the touch sensor switches 2130 and the 2140 to sleep in step S40.

Step S40 is a step for causing the touch sensor switches 2130 and 2140 to sleep when a predetermined period of time has elapsed in order to prevent power consumption of the card key 2100 since a battery is continuously consumed to constantly monitor a sensing status of the touch sensor when the plurality of touch sensor switches 2130 and 2140 are waken up.

In addition, the touch sensor switches 2130 and 2140 are kept in a user's pocket and the like, but the user's finger may cause an error operation, so the touch sensor switches 2130 and 2140 need to be inactivated in step S40 to prevent an error operation when the user's usage is not expected.

In addition, using the error preventive touch unit 2165 provided on the circumference of the logo panel 2160, it is possible to more clearly prevent an error operation which is not expected to be used by the user. That is, step S30 is controlled not to wake up the plurality of touch sensor switches 2130 and 2140 even when operation becomes ON in step S20 if the error operation preventive touch unit 2165 does not detect static electricity of a user.

More specifically, if the error operation preventive touch unit 2165 detects a user's touch, the operation-on switching unit 2200 is primarily activated. That is, if the error operation preventive touch does not detect a user's touch, a predetermined electrical signal according to operation of the operation-on switching unit 2200 is not generated from the beginning.

As such, if a predetermined electrical signal according to operation of the operation-on switching unit 2200 is not generated from the beginning, the following step S30 is not performed as well, so that battery consumption may be secondarily prevented.

In step S40, the predetermined period of time may be set to be equal to or less than 5 seconds. However, aspects of the present disclosure are not limited thereto.

By doing so, an error operation may be prevented in advance by the error operation preventive touch unit 2165, and, even when a user's usage is expected, a function for canceling an operation may be further added, the function which is performed such that a user does not touch the plurality of touch sensor switches 2130 and 2140.

Meanwhile, as described in the above-described one preferable embodiment of a slim smart card key for a vehicle, the plurality of touch sensor switches 2130 and 2140 includes a lock switch and an unlock switch. The performing of the RKE function may be controlled to lock and unlock of a side door in accordance with an electrical signal generated by each of the lock switch 2130 and the unlock switch 2140, to unlock a trunk door in the order of user's touches detected by each of the lock switch and the unlock switch, or to apply a panic function of a vehicle.

More specifically, if a user normally touches only the lock switch 2130, it is possible to control the side door to be locked according to predetermined settings.

In addition, if the user normally touches only the unlock switch 2140, it is possible to control the side door to be unlocked according to predetermined settings.

Furthermore, if a user touches one (e.g., the lock switch 130) of the lock switch 2130 and the unlock switch 2140 and then, after a predetermined period of time has elapsed, touches the other switch (e.g., the unlock switch 2140, it is possible to control the trunk door to be unlocked.

Lastly, in contrary to the case where the user unlocks the trunk door, if the user touches the unlock switch 2140 and then, after a predetermined period of time has elapsed, touches the lock switch 2130, a panic function for generating warning sound to notify an emergency situation may be performed.

As such, in one preferable embodiment of a control method of a slim smart card key for a vehicle according to the present disclosure, two touch sensor switches are provided, and individual functions of the two touch sensor switches 2130 and 2140 are able to be controlled according to an operating status or order of the two touch sensor switches 2130 and 2140, so that the number of components may be reduced and more discretion may be given to design a product.

In addition, according to a control method of a slim smart card key for a vehicle according to the present disclosure, wherein a switching unit according to the second embodiment is included in the slim smart card key, two touch sensor switches 2130 and 2140 are used to perform three functions, so that a product may be simplified and manufacturing costs may be reduced.

How the above-described slim smart card key 2100 for a vehicle according to the present disclosure is controlled by the above-described control method is described with reference to accompanying drawings (especially, FIG. 16), as below.

First, if a contact pad 2220 of the manipulation knob 2160 is electrically connected to the switch contactor 2210 once a user pushes the manipulation knob 2160 of the operation-on switching unit 2200, which corresponds to the logo panel 2160 provided in the card key 2100, the plurality of touch sensor switches 2130 and 2140 are waken up and specific color light is turned on through the display unit 2150 to notify that the plurality of touch sensor switches 2130 and 2140 are waken up (step S10 and step S20).

Then, if the touch sensor operates, it is possible to lock or unlock a side door of the vehicle, to unlock a trunk of the vehicle, and to perform a panic function in accordance with an electrical signal generated according to the operation of the touch sensor (step S30).

Lastly, when a predetermined period of time has elapsed after the touch sensor switches 2130 and 2140 are waken up, the touch sensor switches 2130 and 2140 are rendered to sleep so as to inactivate the touch sensor switches 2130 and 2140, so that power consumption of the card key 2100 may be prevented (step S40).

The third embodiment of a switching unit for applying an RKE function to a slim smart card key according to the present disclosure is described as below.

Figure 17:
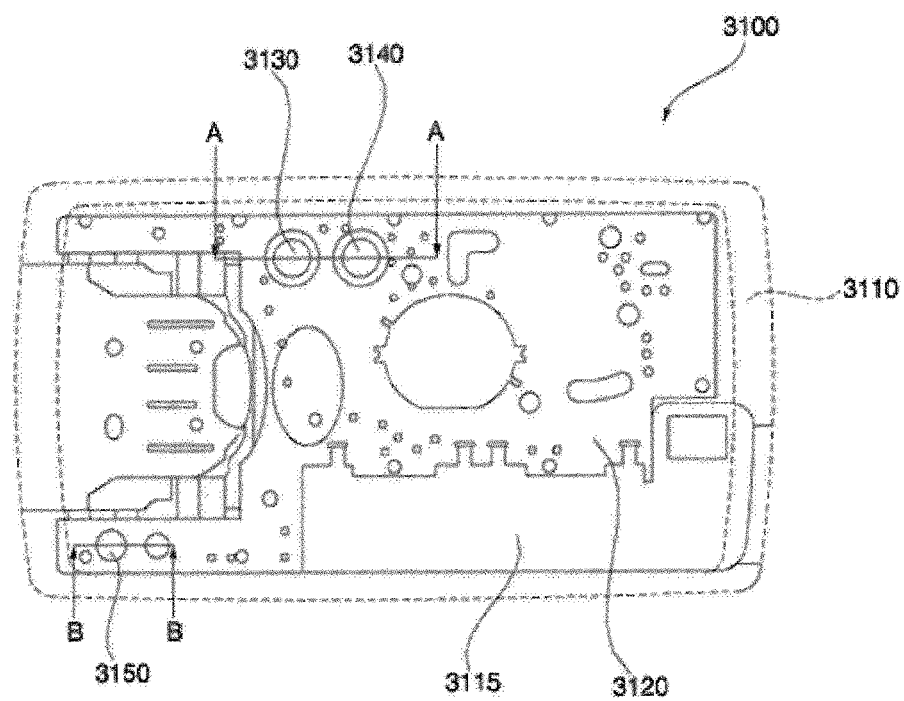
FIG. 17 is a conceptual diagram illustrating a slim smart card key for a vehicle according to the present disclosure, wherein a switching unit according to the third embodiment is applied to the slim smart card key.

FIG. 17 is a conceptual diagram illustrating a slim smart card key for a vehicle according to the present disclosure, wherein a switching unit according to the third embodiment is applied to the slim smart card key; FIGS. 18A to 18D are schematic diagram illustrating a manufacturing procedure of a switching unit when a body, which is one of components shown in FIG. 17, is inserted injection molded; and FIG. 19 is a manufacturing procedure of a display unit when a body, which is one of components shown in FIG. 17, is inserted injection molded.

With reference to FIG. 17, one preferable embodiment of a slim smart card key 3100 for a vehicle according to the present disclosure includes: a body 3100 of which outer appearance is molded as a molding material is hardened by an insert injection molding process; a PCB 3120 to which various electronic components are soldered before the body 3100 is molded by the insert injection molding process and which is disposed inside the body 3110 when the body 3110 is molded in the insert injection molding process; switching units 3130 and 3140 which are coupled to the PCB 3120 before or after the body is molded and which lock and unlock a door of a vehicle by a user's manipulation; and a display unit 3150 which is coupled to the PCB 3120 before or after the body 3110 is molded and which visually displays a locking status of the door according to operations of the switching units 3130 and 3140.

Herein, the body 3110 is formed as a molding material is hardened, as described above, and therefore, the body 3110 is formed in an insert injection method, in which, after various electronic components are soldered to the PCB 3120, the PB 3120 is arranged in a mold frame, which is a molding space and not shown in the drawings, between a lower mold 3200*a* and an upper mold 3200*b*, and the molding material is poured into the mold frame and then hardened.

It is desirable that the molding material consists of an epoxy resin material in terms of hardness and weight. If the molding material is poured into the mold frame between the lower mold 3200*a* and the upper mold 3200*b*, the entire surfaces of the PCB 3120, including a top surface and a bottom surface thereof, are filled with the molding material, so that the body 3110 is formed in the same shape of the mold frame. The slim smart card key 3100 according to the present disclosure is provided with the purpose of a slim-type card key, and thus, it is desirable that thickness of the body 3110 is not greater than 3.4 t.

Meanwhile, in a case where the body 3110 is formed in the longwise shape, a portion having a short edge (length) is called one short side edge or the other short side edge, and a portion having a long edge is called one long side edge or the other long side edge.

A spare key receiving part is formed close to the one long side edge of the body 3110 so that a spare key is inserted from one short side edge toward the other short side edge. The spare key receiving part is formed by a spare key holding plate 3115 which is soldered to the PCB 3120 before the body 3110 is inserted molded with the molding material. In this case, it is obvious that an inserting block may be used to prevent the molding material from flowing into the spare key receiving part.

The switching units 3130 and 3140 may include a lock switch button 3130 which generates a signal for locking the door, and an unlock switch button 3140 which generates a signal for unlocking the door.

The switching units 3130 and 3140 may be switch members which are a kind of contact switch, and each switch member generates a predetermined electrical signal (the locking and unlocking signals) by shutting a contacting circuit formed on the PCB 3120 once the switch member is pressed inwardly into the body 3110 by a physical force applied by a user's finger Meanwhile, the display unit 3150 visually displays a result of switching operations of the switching unit 3130 and 3140 so as to allow a user to recognize the result, and the display unit 3150 may operate in the following: a specific color is turned on (e.g., red) if the door is locked according to an operation of the lock switch button 3130, and a color different from the specific color (e.g., blue) is turned on if the door is unlocked according to an operation of the unlock switch button 3140.

It is desirable that the display unit 3150 is provided as an LED (or an OLED) which irradiates light with different kinds of color, as described above.

The switching units 3130 and 3140 are formed close to the other long side edge that opposes the one long side edge of the body 3110 in which the spare key receiving part is formed, and the display unit 3150 is formed close to the other short side edge that opposes the one short side edge in which the spare key receiving part is formed.

Meanwhile, in one preferable embodiment of the slim smart card key 3100 for a vehicle according to the present disclosure, the switching units 3130 and 3140 or the display unit 3150 is coupled to the PCB 120 before or after the body 3100 is molded.

The following is a case where the switching units 3130 and 3140 or the display unit 3150 is coupled to the PCB 3120 before the body 3110 is molded.

Figure 18A:
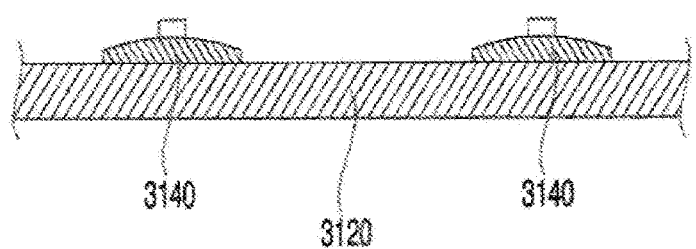
FIGS. 18A to 18D are schematic diagrams illustrating a manufacturing procedure of a switching unit when a body, which is one of components shown in FIG. 17, is inserted injection molded.
Figure 19:
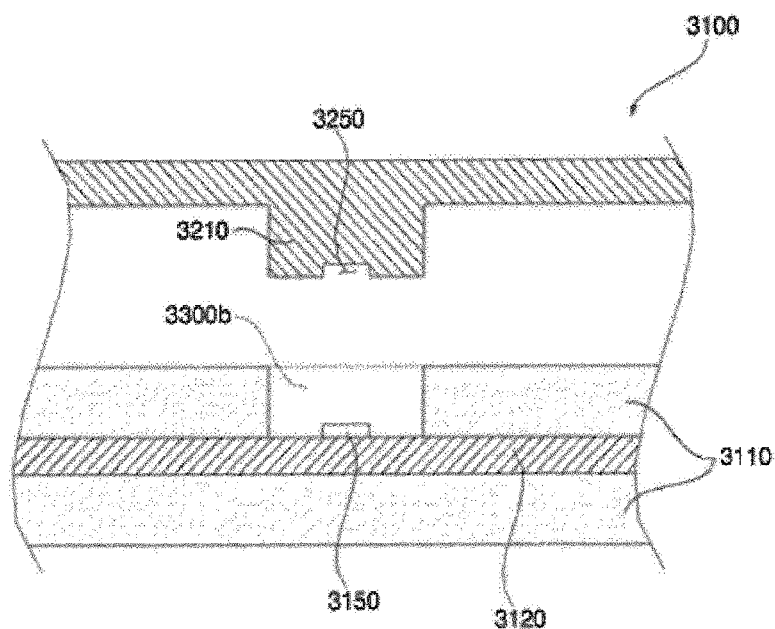
FIG. 19 is a procedure of how to manufacture a display unit when a body, which is one of components shown in FIG. 17, is inserted injection molded.

With reference to FIG. 18A, the lock switch button 3130 and the unlock switch button 3140 are soldered to the PCB 3120.

Figure 18B:
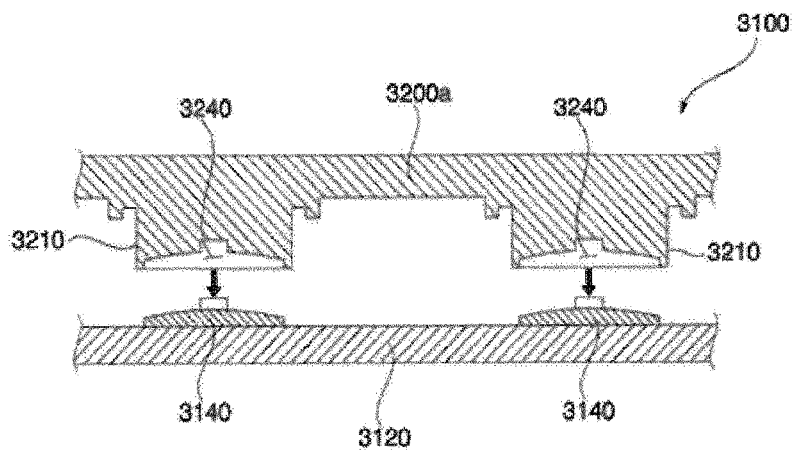

Meanwhile, it is necessary to prevent a molding material, which is used to form the body 3110, from flowing into a portion in which the lock switch button 3130 and the unlock switch button 3140 are soldered. To this end, as shown in FIG. 18B, a molding preventive unit 3210 may be formed in an upper mold 3120 and protrudes downwardly, and a cavity 3240, which is a space that covers the lock switch button 3130 and the unlock switch button 3140, may be formed in the molding preventive unit 3210. The cavity 3240 may be formed in a shape corresponding to that of the lock switch button 3130 and the unlock switch button 3140, while being formed in a button surface of the molding preventive unit 3210 to be dented upwardly. However, the cavity 3240 is not necessary formed in a shape corresponding to the lock switch button 3130 and the unlock switch button 3140, and may be in any shape as long as the cavity 3240 covers the lock switch button 3130 and the unlock switch button to prevent the molding material from flowing therein.

Figure 18C:
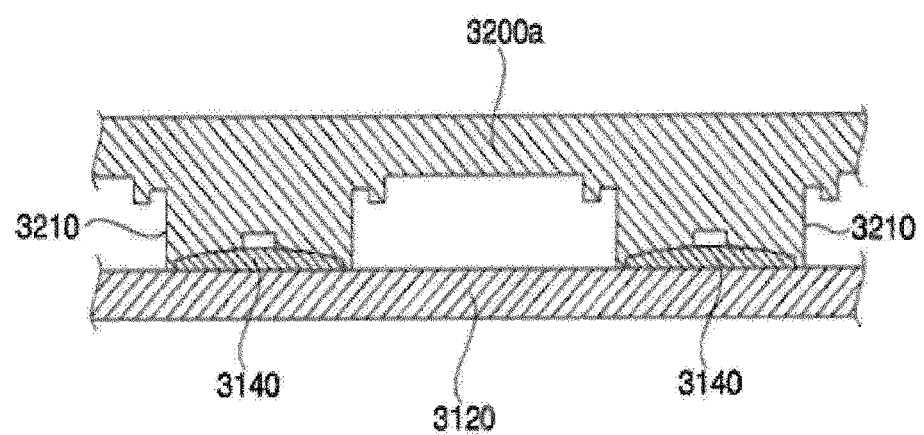

In addition, as shown in FIG. 18C, the upper mold 3200a is secured to a lower mold, and a molding material is poured and primarily hardened to form the body 3110.

When the body 3110 is formed due to the primarily hardening process, an empty space is formed in a shape corresponding to that of the molding preventive unit 3210 because the molding material does not flow into a portion corresponding to the molding preventive unit 3210.

Figure 18D:
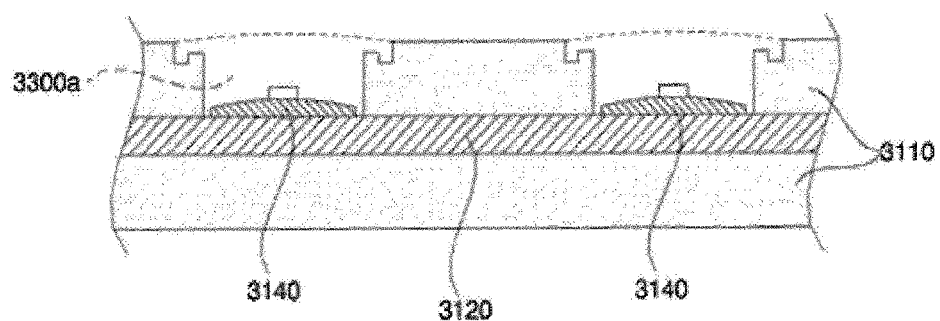

In this empty space, an operation knob 3330a is disposed, as shown in FIG. 18D. The operation knob 3300a may be made by pouring a silicon or urethane molding material into the empty space and then secondarily hardened. The reason that the operation knob 3300a is made of a silicon or urethane material is to effectively deliver a pressing force which is applied by a user to operate the lock switch button 3130 and the unlock switch button 3140.

A top surface of the operation knob 3300a may protrude outwardly in a curved manner, and an image or latter pattern may be printed on the top surface of the operation knob 3300a to distinguish the lock switch button 3130 and the unlock switch button 3140 from each other.

The following is a case in which the switching units 3130 and 3140 or the display unit 3150 is coupled to the PCB 3120 after the body 3110 is molded.

Referring to FIG. 18D, the upper mold 3200, in which the cavity 3240 is not formed on contrary to the example shown in FIG. 18A, is secured to the lower mold, and a molding material is poured and primarily hardened to form the body 3110.

At this point, a portion corresponding to the molding preventive unit 3210 remains as an empty space since the molding material is not capable of flowing thereinto.

On the top surface of the PCB 3120, which corresponds to the empty space, a not-shown soldering land for soldering the lock switch button 3130 and the unlock switch button 3140.

Using the soldering land, the lock switch button 3130 and the unlock switch button 3140 are soldered to an empty space in the PCB 3120, and the operation knob 3300a is disposed in the empty space. In this case, the operation knob 3300a may be the same as an operation knob used in a case where the lock switch button 3130 and the unlock switch button 3140 are first coupled to the PCB 3120, and thus, the operation knob 3300a may have the same material, shape, and functions.

In addition, as shown in FIG. 19, the display unit 3120 is soldered to the PCB 3120, and then disposed in a mold frame formed between the upper mold 3200a and the lower mold for the sake of the insert injection molding process. In this case, the display unit 3150 may be completely covered by a molding material, or a temporary frame 3300 for preventing the molding material from completely covering the display unit 3150 may be disposed above the display unit 3150 since illumination may be lowered unless the molding material is transparent.

It is desirable that the temporary frame 3300 is large enough to form a surface as the same as the top surface of the body 3110. When the body 3110 is molded in the insert injection molding process, the temporary frame 3300 is removed and a cover portion of a transparent silicon material is secondarily hardened and formed in the space where the temporary frame 2200 was disposed, so that the top of the display 3150 is covered.

Of course, the cover portion is formed in the same shape as that of the temporary frame 3300.

Considering a work environment or convenience, an operator may determine whether to solder the switching units 3130 and the 3140 or the display unit 3150 before or after the body 3110 is molded.

As described above, the present disclosure is able not only to apply an active switching function, which is hard to apply to an existing slim smart card key, but also to be made as a slim type, so that it is easy for a user to carry, thereby improving user convenience and work convenience.

As such, a slim smart card key for a vehicle and a control method thereof according to the present disclosure are described in detail with various embodiments thereof in conjunction of accompanying drawings. However, embodiments of the present disclosure are not limited to the above-described embodiments, and various changes, modifications, and equivalents of the methods, apparatuses, and/or systems described herein will be suggested to those of ordinary skill in the art. Accordingly, other implementations are within the scope of the following claims.

The invention claimed is:

1. A slim smart card key for a vehicle, comprising:
a Printed Circuit Board (PCB) to which a plurality of electronic components are soldered, which has a predetermined thickness, and in which a spare key receiving part and a battery receiving part are formed, wherein the spare key receiving part is formed by vertically cutting one side of the PCB and thus is vertically hollow, and the battery receiving part is formed by vertically cutting the other side of the PCB and thus is vertically hollow;
a body part which has a spare key entrance hole for inserting a spare key through the spare key receiving part, and a battery entrance hole for inserting a battery through the battery receiving part, and which is injection molded to embrace the PCB while the PCB is inserted into a mold;
a spare key settling part which is moved toward the spare key receiving part from above or below the PCB before the body part is injection molded, and then sits on and fixed onto a circumference of the spare key receiving part; and
a terminal assembly which is moved in the same direction as that of the spare key settling part before the body part is injection molded, and then sits on and fixed onto a circumference of the battery receiving part,
wherein the spare key settling part vertically protrudes by a predetermined length from the spare key receiving part on the PCB,
wherein the spare key settling part comprises:
an upper plate in which an upper portion settling part is formed, wherein the upper portion settling part protrudes upwardly toward a top of the spare key receiving part, is bent downwardly toward one side among directions orthogonal to a longitudinal direction of the spare key receiving part, and is extended in parallel;
a lower plate in which a lower portion settling part is formed, wherein the lower portion protrudes downwardly toward a bottom of the spare key receiving part and is bent upwardly in one side among directions orthogonal to the longitudinal direction of the spare key receiving part; and
a connecting plate which connects the upper plate, which corresponds to the other side among directions orthogonal to the longitudinal direction of the spare key receiving part, and an end of the lower plate,
wherein a side portion settling part for holding the spare key settling part is formed in the connecting plate, and
wherein the upper portion settling part, the lower portion settling part, and the side portion settling part sit on a top surface of the circumference of the spare key receiving part of the PCB.

2. The slim smart card key of claim 1, wherein the upper portion settling part and the lower portion settling part are formed at the same height.

3. The slim smart card key of claim 2, wherein a plurality of upper portion settling parts and a plurality of lower portion settling parts are provided, and the upper portion settling parts each is arranged between the lower portion settling parts which are adjacent to one another.

4. The slim smart card key of claim 1, wherein a plurality of side portion settling parts are being spaced apart from one another and formed at the same height as that of the upper portion settling part and the lower portion settling part, and
wherein a solder groove for soldering to a top surface of the PCB is formed in the upper portion settling part, the lower portion settling part, and the side portion settling part.

5. The slim smart card key of claim 1, wherein a plurality of location setting groove is provided on the PCB to arrange the spare key settling part at a right location, and
wherein a location setting protrusion, which is to be inserted into the location setting groove, is formed at an end of the upper portion settling part to be bent downwardly.

6. The slim smart card key of claim 1, wherein the terminal assembly comprises:
a first polarity terminal plate which connects a bottom contact surface formed on a bottom surface of the battery inserted through the battery entrance hole; and
a second polarity terminal plate which connects to a top contact surface formed on a top surface of the battery inserted through the battery entrance hole,
wherein a specific space in which the battery is inserted is formed between the first polarity terminal plate and the second polarity terminal plate, and the first polarity terminal plate and the second polarity terminal plate sit on the PCB.

7. The slim smart card key of claim 6, wherein the first polarity terminal plate protrudes toward a bottom of the battery receiving part, and the second polarity terminal plate protrudes a top of the battery receiving part.

8. The slim smart card key of claim 6, wherein a first polarity connecting protrusion is formed on a top surface of the first polarity terminal plate to protrude so as to connect the bottom contact surface of the battery, and
wherein a second polarity connecting protrusion is foamed on a bottom surface of the second polarity terminal plate to protrude so as to connect the top contact surface of the battery.

9. The slim smart card key of claim 8, wherein a plurality of first polarity connecting protrusion and a plurality of second polarity connecting protrusion are formed being spaced apart one another.

10. The slim smart card key of claim 1, wherein an antenna assembly hole is formed on the PCB to be vertically hollow, and part of an antenna assembly is inserted into the antenna assembly hole.

11. The slim smart card key of claim 10, wherein the antenna assembly comprises:
- an antenna part inserted into the antenna assembly hole; and
- a sub PCB in which an vertically hollow opening to allow the antenna part to be inserted is formed, and which is soldered to one surface of the PCB to electrically connect the antenna part and the PCB.

\* \* \* \* \*